US009199626B2

(12) United States Patent
Furukawa et al.

(10) Patent No.: US 9,199,626 B2
(45) Date of Patent: Dec. 1, 2015

(54) CONTROL DEVICE OF VEHICLE

(75) Inventors: Tomoaki Furukawa, Toyota (JP);
Takeshi Kanayama, Toyota (JP); Tetsuo Hori, Toyota (JP); Tomoyuki Maruyama, Tajimi (JP); Akiko Nishimine, Toyota (JP); Takeshi Miyagawa, Toyokawa (JP); Ryoki Ii, Toyota (JP); Koji Hayashi, Aichi-gun (JP); Norihiro Yamamura, Miyoshi (JP); Akihiro Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 14/114,084

(22) PCT Filed: Apr. 27, 2011

(86) PCT No.: PCT/JP2011/060260
§ 371 (c)(1),
(2), (4) Date: Dec. 31, 2013

(87) PCT Pub. No.: WO2012/147177
PCT Pub. Date: Nov. 1, 2012

(65) Prior Publication Data
US 2014/0129067 A1 May 8, 2014

(51) Int. Cl.
*B60W 10/02* (2006.01)
*B60K 6/442* (2007.10)
(Continued)

(52) U.S. Cl.
CPC ............... *B60W 10/02* (2013.01); *B60K 6/442* (2013.01); *B60K 6/445* (2013.01); *B60K 6/52* (2013.01);
(Continued)

(58) Field of Classification Search
CPC ..... B60W 10/02; B60W 10/10; B60W 20/20; B60W 10/06; B60W 30/18127; B60W 10/08; B60W 20/00; B60L 11/1861; B60L 7/14; B60L 11/123; B60L 3/0061; B60L 11/14; B60L 2250/24; B60L 2220/14; B60L 2240/441; B60L 2270/145; B60L 2240/36; B60L 2240/547; B60L 2220/42; B60L 2240/425; B60L 2210/40; B60L 2260/26; B60K 6/445; B60K 6/52; B60K 6/442; B60K 6/543; Y02T 10/7044; Y02T 10/705; Y02T 10/7005; Y02T 10/6217; Y02T 10/6234; Y02T 10/6265; Y02T 10/6239; Y02T 10/648; Y02T 10/7077; Y02T 10/7241; Y10S 903/93; Y10S 903/946; Y10S 903/945
See application file for complete search history.

(56) References Cited

FOREIGN PATENT DOCUMENTS

JP      A-2008-172927      7/2008

*Primary Examiner* — Redhwan K Mawari
*Assistant Examiner* — Edward Torchinsky
(74) *Attorney, Agent, or Firm* — Oliff PLC

(57) ABSTRACT

A control device of a vehicle includes: an engine; a connection/disconnection device configured to connect/interrupt the engine; a rotating machine disposed to enable transmission of drive power to the wheels; and a running position selection device, the control device including a first manual mode selected by performing a deceleration increasing operation by a driver for increasing vehicle deceleration while the automatic running position is selected and a second manual mode selected by performing a deceleration increasing operation by a driver for increasing the vehicle deceleration while the manual running position is selected, while the vehicle is running with the engine interrupted from the wheels, if the first manual mode is selected, the vehicle deceleration being generated only by the rotating machine, and if the second manual mode is selected, the connection/disconnection device being put into the connected state to generate the vehicle deceleration at least by the engine.

12 Claims, 8 Drawing Sheets

(51) Int. Cl.
    *B60K 6/445*     (2007.10)
    *B60K 6/52*     (2007.10)
    *B60K 6/543*     (2007.10)
    *B60W 10/08*     (2006.01)
    *B60W 20/00*     (2006.01)
    *B60W 30/18*     (2012.01)
    *B60L 3/00*     (2006.01)
    *B60L 7/14*     (2006.01)
    *B60L 11/12*     (2006.01)
    *B60L 11/14*     (2006.01)
    *B60L 11/18*     (2006.01)
    *B60W 10/06*     (2006.01)
    *B60W 10/10*     (2012.01)

(52) U.S. Cl.
    CPC ............... B60K 6/543 (2013.01); B60L 3/0061 (2013.01); B60L 7/14 (2013.01); B60L 11/123 (2013.01); B60L 11/14 (2013.01); B60L 11/1861 (2013.01); B60W 10/06 (2013.01); B60W 10/08 (2013.01); B60W 10/10 (2013.01); B60W 20/00 (2013.01); B60W 20/20 (2013.01); B60W 30/18127 (2013.01); *B60L 2210/30* (2013.01); *B60L 2210/40* (2013.01); *B60L 2220/14* (2013.01); *B60L 2220/42* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/441* (2013.01); *B60L 2240/545* (2013.01); *B60L 2240/547* (2013.01); *B60L 2240/549* (2013.01); *B60L 2250/24* (2013.01); *B60L 2260/26* (2013.01); *B60L 2260/28* (2013.01); *B60L 2270/145* (2013.01); *Y02T 10/6217* (2013.01); *Y02T 10/6234* (2013.01); *Y02T 10/6239* (2013.01); *Y02T 10/648* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y10S 903/93* (2013.01); *Y10S 903/945* (2013.01); *Y10S 903/946* (2013.01)

FIG.4

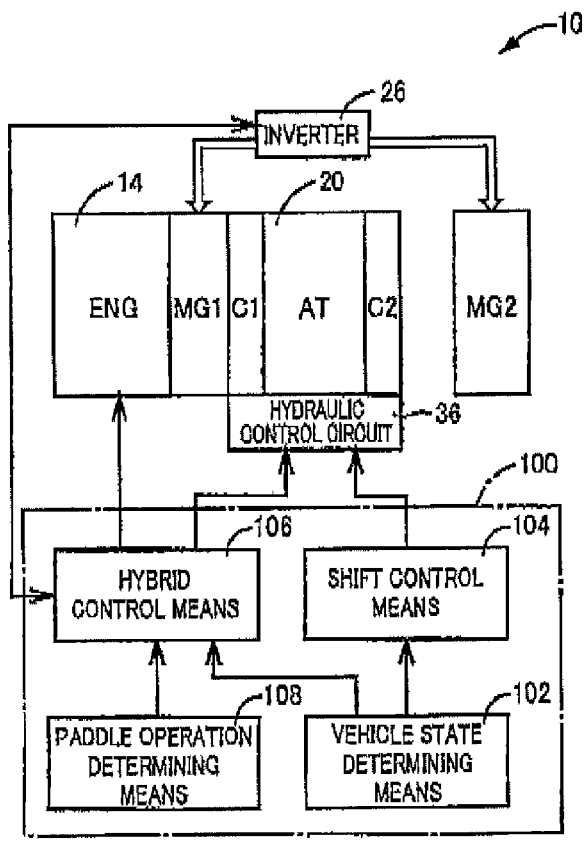

FIG.5

| | | ENGINE 14 | MG1 | MG2 | FIRST CLUTCH C1 | SECOND CLUTCH C2 |
|---|---|---|---|---|---|---|
| EV | | STOP | FREE | POWER RUNNING | RELEASE (INTERRUPT) | RELEASE |
| SERIES HEV | | OPERATE | ELECTRIC GENERATION (REGENERATION) | POWER RUNNING | RELEASE | RELEASE |
| PARALLEL HEV | 1 | OPERATE | POWER RUNNING | FREE | ENGAGE (CONNECT) | ENGAGE |
| | 2 | OPERATE | ELECTRIC GENERATION | POWER RUNNING | ENGAGE | ENGAGE |
| | 3 | OPERATE | FREE | FREE | ENGAGE | ENGAGE |
| DECELERATION RUNNING | EV | STOP | FREE | ELECTRIC GENERATION | RELEASE | RELEASE |
| | SERIES HEV | OPERATE | ELECTRIC GENERATION | ELECTRIC GENERATION | RELEASE | RELEASE |

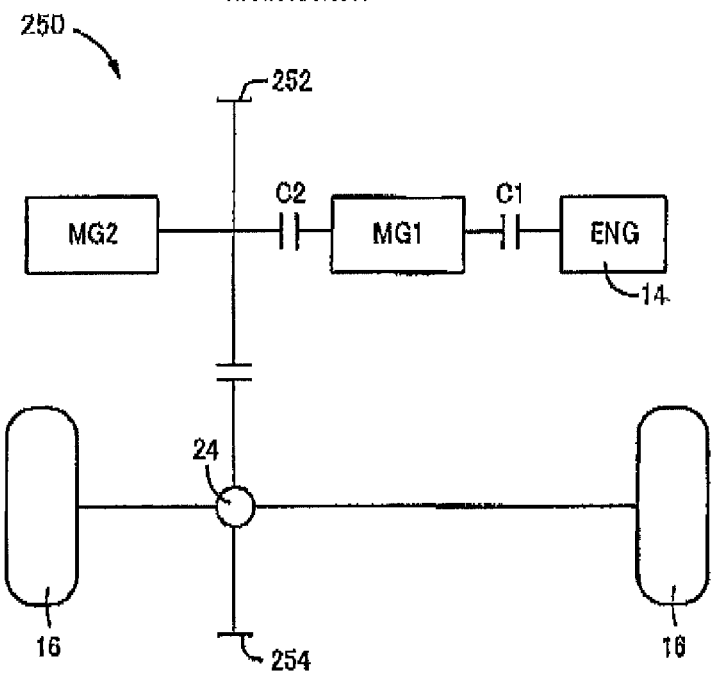

FIG.9(a)
CONFIGURATION

FIG.9(b)
RUNNING MODE

|  |  | ENGINE 14 | MG1 | MG2 | FIRST CLUTCH C1 | SECOND CLUTCH C2 |
|---|---|---|---|---|---|---|
| EV |  | STOP | FREE | POWER RUNNING | RELEASE (INTERRUPT) | RELEASE |
| SERIES HEV |  | OPERATE | ELECTRIC GENERATION (REGENERATION) | POWER RUNNING | ENGAGE (CONNECT) | RELEASE |
| PARALLEL HEV | 1 | OPERATE | POWER RUNNING | FREE | ENGAGE | ENGAGE |
|  | 2 | OPERATE | ELECTRIC GENERATION | POWER RUNNING | ENGAGE | ENGAGE |
|  | 3 | OPERATE | FREE | FREE | ENGAGE | ENGAGE |
| DECELERATION RUNNING | EV | STOP | FREE | ELECTRIC GENERATION | RELEASE | RELEASE |
|  | SERIES HEV | OPERATE | ELECTRIC GENERATION | ELECTRIC GENERATION | ENGAGE | RELEASE |

FIG.10(a)
CONFIGURATION

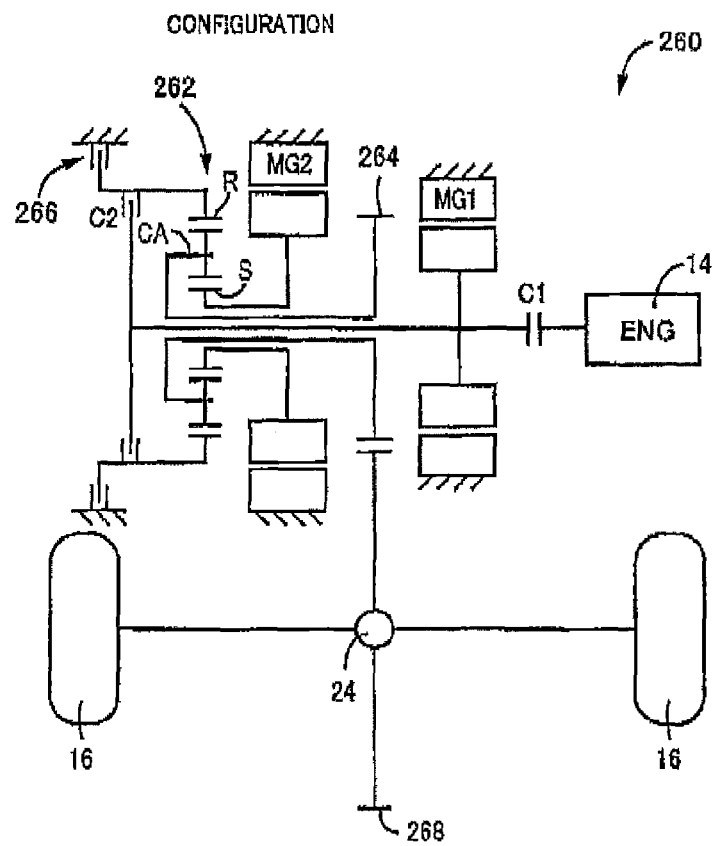

FIG.10(b)
RUNNING MODE

|  |  | ENGINE 14 | MG1 | MG2 | FIRST CLUTCH C1 | SECOND CLUTCH C2 | BRAKE 268 |
|---|---|---|---|---|---|---|---|
| EV |  | STOP | FREE | POWER RUNNING | RELEASE (INTERRUPT) | RELEASE | ENGAGE (FIX) |
| SERIES HEV |  | OPERATE | ELECTRIC GENERATION (REGENERATION) | POWER RUNNING | ENGAGE (CONNECT) | RELEASE | ENGAGE |
| PARALLEL HEV | 1 | OPERATE | FREE | POWER RUNNING | ENGAGE | ENGAGE | RELEASE |
|  | 2 | OPERATE | ELECTRIC GENERATION | POWER RUNNING | ENGAGE | ENGAGE | RELEASE |
| DECELERATION RUNNING | EV | STOP | FREE | ELECTRIC GENERATION | RELEASE | RELEASE | ENGAGE |
|  | SERIES HEV | OPERATE | ELECTRIC GENERATION | ELECTRIC GENERATION | ENGAGE | RELEASE | ENGAGE |

CONTROL DEVICE OF VEHICLE

TECHNICAL FIELD

The present invention relates to a control device of a vehicle including an engine and a rotating machine and capable of running using only the rotating machine as a drive power source for running.

BACKGROUND ART

A vehicle is well-known that includes an engine and a rotating machine to enable motor running in which only the rotating machine is used as a drive power source for running (including series running such as running without using the engine as a drive power source for running even though the engine is activated). For example, this corresponds to a hybrid vehicle described in Patent Document 1. The hybrid vehicle described in Patent Document 1 is equipped with an automatic shift mode in which a gear change is performed in accordance with a predetermined shift map as well as a manual shift mode in which upshift and downshift can be performed by a shift operation of a driver (user) without the shift map as a shift mode that is a shift control pattern of a transmission, for example. If such a manual shift mode is selected during the motor running, a shift stage (gear ratio) or a shift range is fixed and, therefore, particularly when the downshift side is selected, the load of the rotating machine increases and the rotating machine temperature tends to rise as compared to the automatic transmission mode. An excessively high temperature of the rotating machine may make it difficult to generate desired rotating machine output and tend to reduce durability. Therefore, it is desirable to suppress such an excessive increase in the rotating machine temperature as far as possible. Patent Document 1 discloses a technique of changing a cooling temperature at which an oil cooler starts cooling of cooling oil in the rotating machine (e.g., operating oil of a transmission) to a lower temperature when the manual shift mode is selected so as to improve rotating machine cooling performance and suppress a temperature increase in the rotating machine.

PRIOR ART DOCUMENT

Patent Document

Patent Document 1: Japanese Laid-Open Patent Publication No. 2008-172927

SUMMARY OF THE INVENTION

Problems to Be Solved by the Invention

In general, a manual shift mode is achieved by selecting a manual shift position (M position) for implementing the manual shift mode through, for example, an operation of a known shift lever so as to enable running in a shift stage (shift range) selected by the shift operation of the shift lever at the M position. On the other hand, even when an automatic shift position (D position) for implementing an automatic shift mode is selected through an operation of the known shift lever, if an operation switch (e.g., a paddle switch) disposed separately from the shift lever is operated, a shift to the manual shift mode is temporarily made so that a shift stage can be selected in a configuration of some well-known vehicles. Therefore, the manual shift mode is achieved when the M position is selected and when the operation switch (paddle switch) is operated while the D position is selected. In particular, the operation of the operation switch during the D position will be referred to as a D-paddle operation and the operation of the operation switch during the M position will be referred to as an M-paddle operation. Although the manual shift mode is a mode for switching, for example, a gear stage of an automatic transmission through a manual operation, since an acceleration feeling or a deceleration feeling is changed depending on the manual operation, a concept of such a shift operation is applicable to, for example, a concept of a deceleration operation for switching vehicle deceleration through a manual operation even during running not associated with a shift of the automatic transmission. Therefore, the D-paddle operation or the M-paddle operation can increase the vehicle deceleration through a deceleration increasing operation by a user in a manual mode as is the case with the manual shift mode.

It is believed that a temperature increase in a rotating machine must be considered during the motor running even in the manual mode through the D-paddle operation. However, since the manual mode through the D-paddle operation only causes, for example, a temporary shift to the manual mode and automatically returns to an automatic mode, it is believed that the temperature increase in the rotating machine is suppressed as compared to the M-paddle operation. Therefore, even when a shift to the manual mode is made, if the technique disclosed in Patent Document 1, i.e., cooling control of the rotating machine, is uniformly provided in expectation of the temperature increase in the rotating machine, excessive cooling may cause deterioration in fuel efficiency. Additionally, the cooling control in Patent Document 1 is on the premise of addition of an oil pump and an oil cooler for ensuring cooling performance and therefore may increase cost. The problems as described above are not known and no proposal has been made for suppressing an amount of heat generation of the rotating machine without ensuring excessive cooling performance of the rotating machine in preparation for the activation of the rotating machine through the deceleration increasing operation. The same situation occurs in a vehicle including no transmission and having a first manual mode in which the deceleration is changed by a user operation when a running position for switching the deceleration (or drive power) is set to an automatic running position (drive position) for automatically selecting the deceleration and a second manual mode in which the deceleration is changed by a user operation when the running position is set to a manual running position (manual position) for manually selecting the deceleration.

The present invention was conceived in view of the situations and it is therefore an object of the present invention to provide a control device of a vehicle capable of properly suppressing heat generation of a rotating machine at the time of user operation increasing vehicle deceleration during running with an engine interrupted from wheels.

Means for Solving the Problem

To achieve the object, the first aspect of the invention provides (a) a control device of a vehicle comprising: an engine; a connection/disconnection device configured to connect/interrupt the engine with respect to wheels; a rotating machine disposed to enable transmission of drive power to the wheels; and a running position selection device configured to select an automatic running position and a manual running position, the control device of a vehicle including a first manual mode selected by performing a deceleration increasing operation by a driver for increasing vehicle deceleration while the automatic running position is selected and a second manual mode selected by performing a deceleration increasing operation by a driver for increasing the vehicle deceleration while the manual running position is selected, wherein (b) while the vehicle is running with the engine interrupted from the wheels, if the first manual mode is selected, the vehicle deceleration is generated only by the rotating machine, and wherein if the second manual mode is selected, the connection/disconnection device is put into the connected state to generate the vehicle deceleration at least by the engine.

Effects of the Invention

Consequently, while the vehicle is running with the engine interrupted from the wheels, if the first manual mode is selected, the vehicle deceleration is generated only by the rotating machine, and if the second manual mode is selected, the connection/disconnection device is put into the connected state to generate the vehicle deceleration at least by the engine; therefore, in the case of the first manual mode while the automatic running position is selected, since a temporary manual mode is achieved, the temperature of the rotating machine hardly increases even if the vehicle deceleration is generated only by the rotating machine; and, on the other hand, in the case of the second manual mode that is the continuing manual mode and that may put the rotating machine into a thermally severe condition, the load of the rotating machine can be reduced to suppress the excessive heat generation of the rotating machine. Therefore, while the vehicle is running (e.g., the motor running) with the engine interrupted from the wheels, the heat generation of the rotating machine can properly be suppressed at the time of the user operation increasing the vehicle deceleration. From a different viewpoint, since the first manual mode through the deceleration increasing operation by a driver when the automatic running position is selected is the temporary manual mode automatically returning to normal vehicle running in the automatic running position and hardly increases the temperature of the rotating machine, only the rotating machine is used for generating the vehicle deceleration and, on the other hand, since the second manual mode through the deceleration increasing operation by a driver when the manual running position is selected is the continuing manual mode and may put the rotating machine into a thermally severe condition, the engine is used for generating the vehicle deceleration, thereby eliminating the need for ensuring the excessive cooling performance of the rotating machine. As a result, equipment related to the cooling of the rotating machine can be simplified.

The second aspect of the invention provides the control device of a vehicle recited in the first aspect of the invention, wherein if the engine is stopped when the first manual mode is selected, the engine is started with the connection/disconnection device in an interrupted state. Consequently, even though the vehicle deceleration is actually generated only by the rotating machine, it feels as if an engine brake is working as in the vehicle using only the engine as the drive power source for running and an uncomfortable feeling from the generation (increase) of the vehicle deceleration hardly occurs. Alternatively, if the manual running position is selected at the time of the temporary manual mode after the deceleration increasing operation by a driver when the automatic running position is selected and the second manual mode associated with the deceleration increasing operation by a driver when the manual running position is selected is substantially achieved, the engine can promptly be used for generating the vehicle deceleration.

The third aspect of the invention provides the control device of a vehicle recited in the second aspect of the invention, further comprising an electric generator coupled to the engine, wherein the control device makes a shift to series running in which the vehicle deceleration is generated only by the rotating machine while the electric generator is rotationally driven by power of the engine to generate electricity. Consequently, it feels as if the engine brake is working as in the vehicle using only the engine as the drive power source for running and an uncomfortable feeling from the generation (increase) of the vehicle deceleration hardly occurs. Alternatively, if the second manual mode is substantially achieved from the first manual mode, the engine can promptly be used for generating the vehicle deceleration.

The fourth aspect of the invention provides the control device of a vehicle recited in the second or third aspect of the invention, wherein if the engine is stopped when the first manual mode is selected, a rotation speed of the engine after start is made lower as compared to the case that the engine is already activated. This suppresses an uncomfortable feeling due to engine start while the vehicle is running (e.g., during the motor running) with the engine interrupted from the wheels when the engine is originally stopped.

The fifth aspect of the invention provides the control device of a vehicle recited in any one of the first to fourth aspects of the invention, wherein if the manual running position is selected in the running position selection device while the first manual mode is continued, the connection/disconnection device is put into the connected state to generate the vehicle deceleration by the engine. Consequently, if the manual running position is selected during the temporary manual mode when the automatic running position is selected, it is considered that the deceleration increasing operation by a driver when the manual running position is selected is substantially performed.

The sixth aspect of the invention provides the control device of a vehicle in any one of first to fifth aspects of the invention, further comprising an automatic transmission configured to shift gears depending on a shift operation by a driver, wherein the connection/disconnection device includes a first clutch disposed between the engine and an output rotation member of the automatic transmission and a second clutch disposed between the output rotation member of the automatic transmission and the wheels, wherein the interrupted state of the connection/disconnection device is a state in which at least one of the first clutch and the second clutch is released such that power cannot be transmitted, and wherein the connected state of the connection/disconnection device is a state in which both the first clutch and the second clutch are engaged such that power can be transmitted. Consequently, during the motor running in which only the rotating machine is used as a drive power source for running with the connection/disconnection device interrupted, it allows only the rotating machine to generate the vehicle deceleration and, the connection/disconnection device is put into the connected state to allow at least the engine to generate the vehicle deceleration.

The seventh aspect of the invention provides the control device of a vehicle in the sixth aspect of the invention, wherein if the first manual mode is selected, the first clutch is engaged while the second clutch is released, and wherein if the manual running position is selected in the running position selection device while the first manual mode is continued, the second clutch is engaged. Consequently, if the deceleration increasing operation is performed when the automatic running position is selected, the interrupted state of the connection/disconnection device is properly maintained to allow only the rotating machine to generate the vehicle deceleration and, if the manual running position is selected while the temporary manual mode through the deceleration increasing operation is continued, the connection/disconnection device can promptly be put into the connected state to allow the engine to generate the vehicle deceleration. When the interrupted state of the connection/disconnection device is maintained, if the second clutch is engaged while the first clutch is kept released, an inertia part of the automatic transmission is applied to the wheels and a deceleration shock may occur; however, since the first clutch is engaged while the second clutch is kept released, such a deceleration shock does not occur.

The eighth aspect of the invention provides the control device of a vehicle in the sixth or seventh aspect of the invention, wherein if the automatic running position is switched to the manual running position in the running position selection device, the first clutch is engaged while the second clutch is released, and wherein if the deceleration increasing operation is performed, the second clutch is engaged. Consequently, if the manual running position is selected instead of the automatic running position while the automatic running position is selected, the interrupted state of the connection/disconnection device can be properly maintained and, if the deceleration increasing operation is performed when the manual running position is selected, the connection/disconnection device can be put into the connected state by simply engaging the second clutch and the vehicle deceleration can promptly be generated by the engine. When the interrupted state of the connection/disconnection device is maintained, if the second clutch is engaged while the first clutch is kept released, the inertia part of the automatic transmission is applied to the wheels and a deceleration shock may occur; however, since the first clutch is engaged while the second clutch is kept released, such a deceleration shock does not occur.

The ninth aspect of the invention provides the control device of a vehicle in any one of the first to eighth aspects of the invention, further comprising a deceleration increasing device configured to increase the vehicle deceleration based on an operation of the driver separately from the running position selection device, wherein the deceleration increasing operation is an operation of the driver using the deceleration increasing device. Consequently, the deceleration increasing operation by a driver is properly performed while the automatic running position or the manual running position is selected.

To achieve the object, the tenth aspect of the invention provides (a) a control device of a vehicle comprising: an engine; a connection/disconnection device configured to connect/interrupt the engine with respect to wheels; a rotating machine disposed to enable transmission of drive power to the wheels without through the connection/disconnection device; a running position selection device configured to select an automatic running position and a manual running position based on an operation of a driver; and a deceleration increasing device disposed separately from the running position selection device, the deceleration increasing device being configured to increase vehicle deceleration based on an operation of the driver, wherein (b) while the vehicle is running with the engine interrupted from the wheels, if the vehicle deceleration is increased by performing a deceleration increasing operation increasing the vehicle deceleration in the deceleration increasing device when the manual running position is selected in the running position selection device, a torque capacity of the connection/disconnection device is made larger as compared to the case that the vehicle deceleration is increased with the engine interrupted from the wheels by performing the deceleration increasing operation increasing the vehicle deceleration in the deceleration increasing device when the automatic running position is selected in the running position selection device.

Consequently, while the vehicle is running with the engine interrupted from the wheels, if the vehicle deceleration is increased by performing the deceleration increasing operation increasing the vehicle deceleration in the deceleration increasing device when the manual running position is selected in the running position selection device, the torque capacity of the connection/disconnection device is made larger as compared to the case that the vehicle deceleration is increased with the engine interrupted from the wheels by performing the deceleration increasing operation increasing the vehicle deceleration in the deceleration increasing device when the automatic running position is selected in the running position selection device. Therefore, in the case of performing the deceleration increasing operation by a driver while the automatic running position is selected, since a temporary vehicle deceleration is generated, the temperature of the rotating machine hardly increases even if the vehicle deceleration is generated only by the rotating machine; and, on the other hand, in the case of performing the deceleration increasing operation by a driver while the manual running position that is the continuing generation of the vehicle deceleration and that may put the rotating machine into a thermally severe condition is selected, the load of the rotating machine can be reduced to suppress the excessive heat generation of the rotating machine. Therefore, while the vehicle is running (e.g., the motor running) with the engine interrupted from the wheels, the heat generation of the rotating machine can properly be suppressed at the time of the user operation increasing the vehicle deceleration. From a different viewpoint, since the generation of the vehicle deceleration through the deceleration increasing operation by a driver when the automatic running position is selected is temporary until automatic returning to normal vehicle running in the automatic running position is performed and hardly increases the temperature of the rotating machine, only the rotating machine is used for generating the vehicle deceleration and, on the other hand, since the generation of the vehicle deceleration through the deceleration increasing operation by a driver when the manual running position is selected is continuous and may put the rotating machine into a thermally severe condition, the engine is used for generating the vehicle deceleration, thereby eliminating the need for ensuring the excessive cooling performance of the rotating machine. As a result, equipment related to the cooling of the rotating machine can be simplified.

The eleventh aspect of the invention provides the control device of a vehicle recited in the tenth aspect of the invention, wherein if the engine is stopped when the automatic running position is selected and the deceleration increasing operation is performed by the driver, the engine is started with the connection/disconnection device in an interrupted state. Consequently, even though the vehicle deceleration is actually generated only by the rotating machine, it feels as if the engine brake is working as in the vehicle using only the engine as the drive power source for running and an uncomfortable feeling from the generation (increase) of the vehicle deceleration hardly occurs. Alternatively, if the manual running position is selected at the time of generating the temporary vehicle deceleration associated with the deceleration increasing operation by a driver when the automatic running position is selected and the deceleration increasing operation by a driver when the manual running position is selected is substantially achieved, the manual running position is selected, the engine can promptly be used for generating the vehicle deceleration.

The twelfth aspect of the invention provides the control device of a vehicle recited in the eleventh aspect of the invention, further comprising an electric generator coupled to the engine, wherein the control device makes a shift to series running in which the vehicle deceleration is generated only by the rotating machine while the electric generator is rotationally driven by power of the engine to generate electricity. Consequently, it feels as if the engine brake is working as in the vehicle using only the engine as the drive power source for running and an uncomfortable feeling from the generation (increase) of the vehicle deceleration hardly occurs. Alternatively, if the deceleration increasing operation by a driver when the manual running position is selected is substantially achieved from the deceleration increasing operation by a driver when the automatic running position is selected, the engine can promptly be used for generating the vehicle deceleration.

BRIEF DESCRIPTION OF THE DRAWINGS

FIG. 4 is a block diagram for explaining a main portion of a control function of an electronic control device.

FIG. 5 is a chart for explaining various running modes and operating states of each portion in the hybrid vehicle.

FIG. 9 is a diagram for explaining another hybrid vehicle to which the present invention is applied; (a) is a diagram of a general configuration; (b) is a diagram of a plurality of running modes and operating states of each portion.

FIG. 10 is a diagram for explaining further hybrid vehicle to which the present invention is applied; (a) is a diagram of a general configuration; (b) is a diagram of a plurality of running modes and operating states of each portion.

MODE FOR CARRYING OUT THE INVENTION

Figure 1:
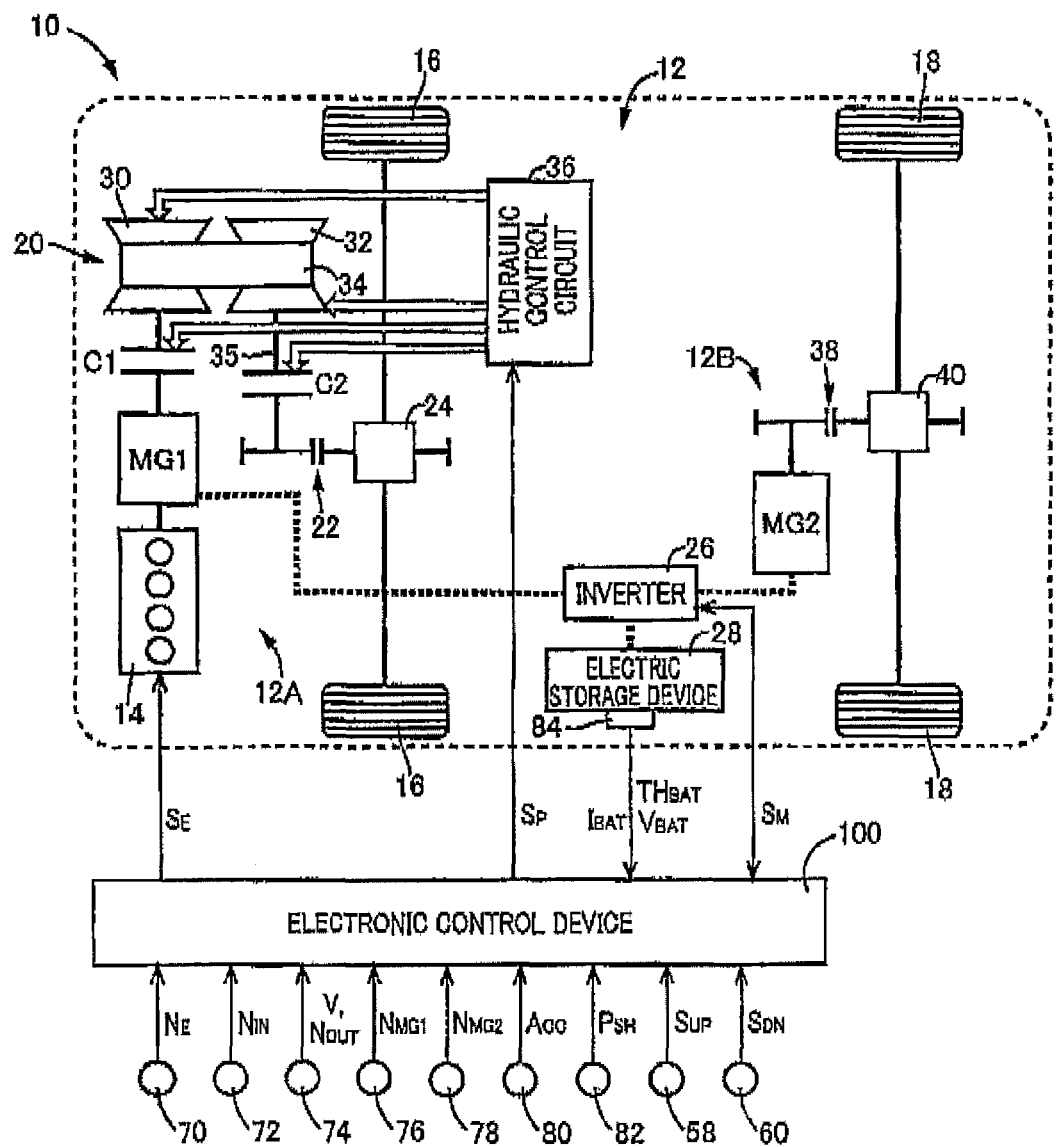
FIG. 1 is a diagram for explaining a general configuration of a power transmission path making up a hybrid vehicle to which the present invention is applied, and is a diagram for explaining a main portion of a control system disposed in the vehicle.

In the present invention, preferably, the engine is an internal-combustion engine combusting fuel to generate power. The rotating machine is a rotating electric machine and is specifically an electric generator, an electric motor, or a motor generator selectively providing the functions thereof. Although the rotating machine may be connected to wheels connected via the connection/disconnection device to the engine to drive the wheels without through the connection/disconnection device, the rotating machine can be configured to drive wheels different from those driven by the engine such that the rotating machine drives rear wheels (or front wheels) when the engine drives front wheels (or rear wheels). The connection/disconnection device can connect/interrupt power transmission and is a wet or dry engagement device (such as a friction engagement or meshing clutch and brake) disposed in a power transmission path from the engine to the wheels, an engagement device that is disposed in an automatic transmission making up a portion of the power transmission path and that can be put the automatic transmission into a so-called neutral state in which the power transmission is interrupted, etc.

Preferably, the automatic transmission is made up of a stand-alone transmission, a transmission having a hydraulic transmission device such as a torque converter, or a transmission having a sub-transmission. This transmission is made up of a known planetary gear automatic transmission, a known synchronous meshing type parallel shaft automatic (/manual) transmission, a so-called DCT (Dual Clutch Transmission) that is a synchronous meshing type parallel shaft automatic transmission and that is a transmission of a type having two systems of input shafts, a known belt type continuously variable transmission, a known traction type continuously variable transmission, etc.

Preferably, the vehicle has an EV (Electric Vehicle) running mode enabling the vehicle to run using only the rotating machine as the drive power source for running with the engine separated from a drive power transmission path, as a running mode in which vehicle deceleration can be generated only by the rotating machine. The vehicle may include a series HEV (Hybrid Electric Vehicle) running mode enabling the vehicle to run using only the rotating machine as the drive power source for running while, for example, an electric generator is rotationally driven for electric generation by the engine separated from the drive power transmission path, as a running mode in which vehicle deceleration can be generated only by the rotating machine. These EV and series HEV running modes are running modes for performing the motor running using only the rotating machine as the drive power source for running with the connection/disconnection device interrupted.

Preferably, the vehicle has a parallel HEV running mode in which the engine is connected to the drive power transmission path to enable the vehicle to run using at least the engine as a drive power source for running, as a running mode in which vehicle deceleration can be generated by the engine. The parallel HEV running mode may include not only a narrowly-defined parallel HEV running mode in which the engine is connected to the drive power transmission path to enable the vehicle to run using the engine and the rotating machine as the drive power sources for running but also an engine running mode enabling the vehicle to run using only the engine as the drive power source for running, a series parallel HEV running mode causing the vehicle to run using the engine and the rotating machine as the drive power sources for running while, for example, an electric generator is rotationally driven by the engine for electric generation, etc. In other words, the engine may always be used as a drive power source for running while at least one of the rotating machines is used as a drive power source on a constant basis or in an assistive manner. In the parallel HEV running mode, the engine is connected to the wheels and the vehicle deceleration can be generated by the engine at the time of deceleration running, for example.

An example of the present invention will now be described in detail with reference to the drawings.

First Example

FIG. 1 is a diagram for explaining a general configuration of a power transmission path in a drive device 12 making up a hybrid vehicle 10 (hereinafter referred to as a vehicle 10) that is a vehicle to which the present invention is applied, and is a diagram for explaining a main portion of a control system disposed in the vehicle 10. In FIG. 1, the drive device 12 includes a front drive portion 12A equipped with an engine 14 and a first motor generator MG1 enabled to function as drive power sources for running (hereinafter referred to as drive power sources) to drive front drive wheels 16 that are a pair of left and right wheels on the front side and a rear drive portion 12B equipped with a second motor generator MG2 enabled to function as a drive power source to drive rear drive wheels 18 that are a pair of left and right wheels on the rear side.

The front drive portion 12A includes the engine 14 as well as the first motor generator MG1, a first clutch C1, an automatic transmission 20, a second clutch C2, a first gear pair 22, and a front differential gear device 24 disposed in this order from the engine 14 side and coupled to each other in series in a power transmission path between the engine 14 and the front drive wheels 16. As described above, the engine 14 is coupled to the front drive wheels 16 sequentially through the first motor generator MG1, the first clutch C1, the automatic transmission 20, the second clutch C2, the first gear pair 22, and the front differential gear device 24.

The engine 14 is made up of a well-known internal-combustion engine combusting fuel to generate power and has output adjusted by controlling an intake air amount, a fuel injection amount, and ignition timing, for example. At the start of the engine, for example, the first motor generator MG1 acts as an engine starting device (engine starter).

The first motor generator MG1 is made up of an alternating-current synchronous motor generator acting as both an electric motor and an electric generator and is electrically connected via an inverter 26 to an electric storage device 28. The activation of the first motor generator MG1 is controlled by the inverter 26.

The automatic transmission 20 is made up of a well-known belt type continuously variable transmission including an input-side groove width variable pulley 30 coupled via the first clutch C1 to the first motor generator MG1, an output-side groove width variable pulley 32 disposed in parallel with the input-side groove width variable pulley 30 and coupled via the second clutch C2 to the first gear pair 22, and a transmission belt 34 wrapped around each of the pulleys 30 and 32. The automatic transmission 20 has an input/output rotation speed ratio, i.e., a gear ratio γ and a belt pinching force changed by controlling each of the groove widths of the groove width variable pulleys 30 and 32 by a hydraulic control circuit 36. The gear ratio γ is a ratio between an input-side pulley rotation speed $N_{CF}$ that is a rotation speed of the input-side groove width variable pulley 30 and an output-side pulley rotation speed $N_{CR}$ that is a rotation speed of the output-side groove width variable pulley 32 ($N_{CF}/N_{CR}$).

Each of the first clutch C1 and the second clutch C2 is made up of a well-known wet multi-plate clutch and the engagement/release thereof is controlled by the hydraulic control circuit 36. The first clutch C1 is disposed between the engine 14 and a transmission output shaft 35 acting as an output rotation member of the automatic transmission 20. The second clutch C2 is disposed between the transmission output shaft 35 and the front drive wheels 16. The first clutch C1 and the second clutch C2 act as a connection/disconnection device capable of connecting/interrupting the coupling of the engine 14 and the first motor generator MG1 with respect to the front drive wheels 16. An interrupted state of the connection/disconnection device is a state in which at least one of the first clutch C1 and the second clutch C2 is released such that power cannot be transmitted, and a connected state of the connection/disconnection device is a state in which both the first clutch C1 and the second clutch C2 are connected such that power can be transmitted.

The rear drive portion 12B includes the second motor generator MG2 as well as a second gear pair 38 and a rear differential gear device 40 disposed in this order from the second motor generator MG2 side and coupled to each other in series in a power transmission path between the second motor generator MG2 and the rear drive wheels 18. As described above, the second motor generator MG2 is coupled to the rear drive wheels 18 sequentially through the second gear pair 38 and the rear differential gear device 40 and is a rotating machine disposed such that the drive power can be transmitted to the rear drive wheels 18 without through the first clutch C1 and the second clutch C2.

The second motor generator MG2 is made up of an alternating-current synchronous motor generator acting as both an electric motor and an electric generator as is the case with the first motor generator MG1 and is electrically connected via the inverter 26 to the electric storage device 28. The activation of the second motor generator MG2 is controlled by the inverter 26.

The vehicle 10 of this example can switch a shift mode of the automatic transmission 20 between an automatic shift mode in which the automatic transmission 20 is shifted in accordance with a known shift map defined as a predetermined relationship and a manual shift mode in which the automatic transmission 20 can be shifted through a shift operation by a user. Therefore, the vehicle 10 has a shift operation device 52 as depicted in FIG. 2 disposed, for example, beside a driver seat and including a shift lever 50 acting as a shift position selection device that can be operated through an artificial operation to select a plurality of shift positions $P_{SH}$ including an automatic shift position for setting the shift mode to the automatic shift mode and a manual shift position for setting the shift mode to the manual shift mode.

Figure 2:
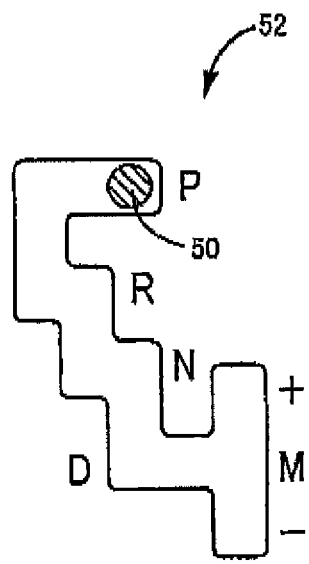
FIG. 2 is a diagram of an example of a shift operation device switching a plurality of shift positions through an artificial operation.

In FIG. 2, the shift lever 50 is disposed to be manually operated to "P (parking)" that is a parking position (P position) for achieving a neutral state in which the power transmission path in the front drive portion 12A is interrupted while the second motor generator MG2 is put into a no-load state (free state) and for locking the output shaft of the automatic transmission 20; "R (reverse)" that is a backward running position (R position) for backward running; "N (neutral)" that is a neutral position (N position) for achieving the neutral state; "D (drive)" that is a forward automatic running position (drive position, D position) acting as an automatic shift position for establishing the automatic shift mode to provide automatic shift control within a variation range of the gear ratio γ to which the automatic transmission 20 can be shifted; or "M (manual)" that is a forward manual running position (manual position, M position) acting as a manual shift position for establishing the manual shift mode to provide shift control of the automatic transmission 20 so as to achieve the gear ratio γ corresponding to a predetermined shift stage (gear stage) changed in accordance with the shift operation of the shift lever 50. As described above, the shift lever 50 also acts as a running position selection device that can select the D position and the M position based on an operation of a driver (user).

The M position is disposed at the same position as the D position in the longitudinal direction of the vehicle 10 adjacently along the width direction of the vehicle 10, for example, and when the shift lever 50 is operated to the M position, a change is made to any of a plurality of shift stages set and stored in advance corresponding to a plurality of stepwise gear ratios in the automatic transmission 20 depending on the operation of the shift lever 50. Specifically, the M position is disposed with an upshift position "+" and a downshift position "−" along the longitudinal direction of the vehicle 10 and when the shift lever 50 is operated to the upshift position "+" or the downshift position "−", the switch to any of the shift stages is made. As a result, the switch to the desired shift stage is made based on the user operation of the shift lever 50. The shift lever 50 is automatically returned to the M position from the upshift position "+" or the downshift position "−" by a biasing means such as a spring.

Figure 3:
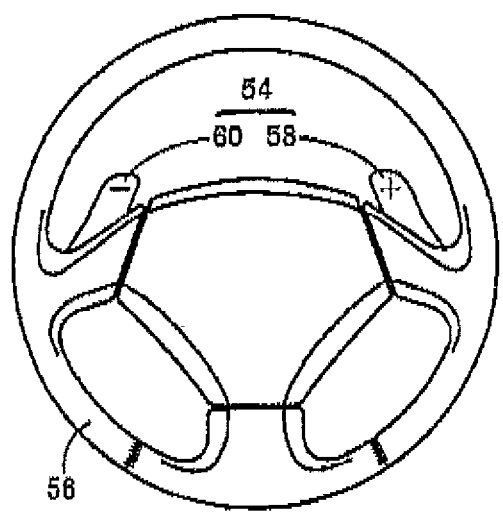
FIG. 3 is diagram of an example of a shift operation device disposed separately from a shift lever for performing the shift operation.

The vehicle 10 has a shift operation device 54 capable of the shift operation equivalent to the shift operation using the shift lever 50 to the upshift position "+" or the downshift position "−" at the M position. FIG. 3 is diagram of an example of the shift operation device 54 disposed separately from the shift lever 50 for performing the shift operation. In FIG. 3, the shift operation device 54 is a paddle switch 54 mounted on a steering wheel 56 and is disposed with an upshift switch 58 and a downshift switch 60. For example, a driver can operate the upshift switch 58 and the downshift switch 60 toward the driver while holding the steering wheel 56, thereby performing the shift operation equivalent to the shift operation using the shift lever 50. Specifically, when the shift lever 50 is operated to the M position, if the upshift switch 58 or the downshift switch 60 is operated, a switch is made to any of the shift stages set in advance in the automatic transmission 20. As a result, in the manual shift mode, the switch to the desired shift stage is made based on the user operation of the paddle switch 54. The paddle switch 54 is automatically returned to an initial position by a biasing means such as a spring.

In this example, even when the D position is selected by the shift lever 50, a shift to the manual shift mode can temporarily be made by the shift operation using the paddle switch 54. Specifically, when the shift lever 50 is operated to the D position, if the upshift switch 58 or the downshift switch 60 is operated, the shift mode is temporarily set to the manual shift mode and a switch is made to any of the shift stages set in advance in the automatic transmission 20 depending on the user operation of the paddle switch 54.

The shift operation using the shift lever 50 or the paddle switch 54 is basically an operation of switching a plurality of gear stages set in the automatic transmission 20 based on a user's operation in the manual shift mode; however, a concept of such a shift operation is applicable to the second motor generator MG2 transmitting the power without through a transmission. In other words, the user operation using the shift lever 50 or the paddle switch 54 can change a regeneration amount of the second motor generator MG2. Specifically, by setting drive torque or regenerative torque that can be output by the second motor generator MG2 in stages and by outputting the torque set in stages depending on the user operation of the shift lever 50 or the paddle switch 54, a user can obtain a feeling equivalent to an acceleration feeling or a deceleration feeling generated depending on the shift operation of the automatic transmission 20 as if the gear stage is switched during running using only the second motor generator MG2 (i.e., during the motor running). Therefore, in this example, even during running not associated with a shift of the automatic transmission 20, for example, during the motor running, the torque set in stages is assumed as gear stages for convenience, and a plurality of the gear stages is set as is the case with the automatic transmission 20 at the time of the manual shift mode so as to apply the concept of the upshift operation and the downshift operation. The shift operation of the upshift operation and the downshift operation leads to increase/decrease in vehicle acceleration at the time of driving and leads to increase/decrease in vehicle deceleration at the time of deceleration running. Particularly, at the time of the deceleration running during the motor running, the user operation using the shift lever 50 or the paddle switch 54 should be considered as a deceleration increasing/decreasing operation increasing/decreasing the vehicle deceleration (a deceleration decreasing operation or a deceleration increasing operation). Therefore, in this example, the deceleration increasing/decreasing operation (deceleration changing operation) is handled in the same way as the shift operation using the shift lever 50 or the paddle switch 54 (the upshift operation or the downshift operation).

Specifically, in this example, a manual shift mode is included as a manual mode in which the vehicle deceleration can be increased/decreased through the deceleration increasing/decreasing operation by a user, and a shift operation in the manual shift mode corresponds to the deceleration increasing/decreasing operation by the user in the manual mode, i.e., a deceleration request of the user. For example, the downshift operation corresponds to a deceleration increasing operation making the vehicle deceleration larger through the user operation, i.e., a deceleration increasing request for making the deceleration request of the user larger. The upshift operation corresponds to a deceleration decreasing operation making the vehicle deceleration smaller through the user operation, i.e., a deceleration decreasing request for making the deceleration request of the user smaller. The paddle switch 54 is a deceleration changing device disposed separately from the shift lever 50 and capable of changing the vehicle deceleration based on a user's operation. Particularly, the downshift switch 60 is a deceleration increasing device capable of increasing the vehicle deceleration based on a user's operation.

Returning to FIG. 1, the vehicle 10 includes an electronic control device 100 including a control device related to hybrid drive control, for example. For example, the electronic control device 100 includes a so-called microcomputer having a CPU, a RAM, a ROM, an I/O interface, etc., and the CPU executes signal processes in accordance with programs stored in advance in the ROM, while utilizing a temporary storage function of the RAM, to provide various controls of the vehicle 10. For example, the electronic control device 100 provides output control of the engine 14, output control including regenerative control of the first motor generator MG1 and the second motor generator MG2, shift control of the automatic transmission 20, engagement control of the first clutch C1 and the second clutch C2, etc., and is configured separately for engine control, rotating machine control, hydraulic control, etc., as needed.

The electronic control device 100 is supplied with, for example, a signal indicative of an engine rotation speed $N_E$ that is the rotation speed of the engine 14 detected by an engine rotation speed sensor 70; a signal indicative of a transmission input rotation speed $N_{IN}$ (i.e., the input-side pulley rotation speed $N_{CF}$) that is the input rotation speed of the automatic transmission 20 detected by an input rotation speed sensor 72; a signal indicative of a transmission output rotation speed $N_{OUT}$ (i.e., the output-side pulley rotation speed $N_{CR}$) that is the output rotation speed of the automatic transmission 20 corresponding to a vehicle speed V detected by an output rotation speed sensor 74; a signal indicative of a first rotating machine rotation speed $N_{MG1}$ that is the rotation speed of the first motor generator MG1 detected by a first rotating machine rotation speed sensor 76; a signal indicative of a second rotating machine rotation speed $N_{MG2}$ that is the rotation speed of the second motor generator MG2 detected by a second rotating machine rotation speed sensor 78; a signal indicative of an accelerator opening degree Acc that is an operation amount of an accelerator pedal acting as a drive power request amount (driver request output) for the vehicle 10 from a driver (user) detected by an accelerator opening degree sensor 80; a signal indicative of the shift position (lever position, operation position) $P_{SH}$ that is an operation position (including the upshift position "+" and the downshift position "−") of the shift lever 50 detected by a shift position sensor 82; a signal indicative of a switch operation $S_{UP}$ of the upshift switch 58 detected by the paddle switch 54; a signal indicative of a switch operation $S_{DN}$ of the downshift switch 60 detected by the paddle switch 54; signals indicative of a battery temperature $TH_{BAT}$, a battery input/output current (battery charging/discharging current) $I_{BAT}$, and a battery voltage $V_{BAT}$ of the electric storage device 28 detected by a battery sensor 84, etc. The electronic control device 100 sequentially calculates a state of charge (charged capacity) SOC of the electric storage device 28 based on the battery temperature $TH_{BAT}$, the battery charging/discharging current $I_{BAT}$, and the battery voltage $V_{BAT}$, for example.

The electronic control device 100 outputs, for example, an engine output control command signal $S_E$ for the output control of the engine 14; a rotating machine control command signal $S_M$ for controlling the activation of the first motor generator MG1 and the second motor generator MG2; and an oil pressure command signal $S_P$ for actuating electromagnetic valves (solenoid valves) etc., included in the hydraulic control circuit 36 for controlling hydraulic actuators of the first clutch C1 and the second clutch C2 and the automatic transmission 20.

FIG. 4 is a block diagram for explaining a main portion of a control function of the electronic control device 100. In FIG. 4, a vehicle state determining portion, i.e., a vehicle state determining means 102 determines whether the shift position $P_{SH}$ of the shift lever 50 is the D position. The vehicle state determining means 102 determines whether the shift position $P_{SH}$ of the shift lever 50 is the M position.

A shift control portion, i.e., a shift control means 104 provides the shift control of the automatic transmission 20. For example, if the vehicle state determining means 102 determines that the shift position is the D position, the shift control means 104 sets the shift mode to the automatic shift mode, calculates a target transmission input rotation speed $N_{IN}^*$ based on a vehicle state indicated by the actual vehicle speed V and the accelerator opening degree Acc from a predetermined relationship (shift diagram, shift map) stored in advance using the vehicle speed V and the accelerator opening degree Acc (or output torque of the transmission $T_{OUT}$ or the like) as variables, and outputs to the hydraulic control circuit 36 the oil pressure command signal $S_P$ controlling the hydraulic actuators of the automatic transmission 20 so that the transmission input rotation speed $N_{IN}$ changes toward the target transmission input rotation speed $N_{IN}^*$. As a result, the gear ratio γ is automatically controlled in the automatic shift mode at the time of the D position. For example, if the vehicle state determining means 102 determines that the shift position is the M position, the shift control means 104 sets the shift mode to the manual shift mode and outputs to the hydraulic control circuit 36 the oil pressure command signal $S_P$ changing a plurality of the shift stages set and stored in advance corresponding to a plurality of stepwise gear ratios in the automatic transmission 20 depending on a shift operation of the shift lever 50 or the paddle switch 54 by a user regardless of the shift map. As a result, a switch is made to the desired shift stage corresponding to the user operation in the manual shift mode at the time of the M position. For example, if the paddle switch 54 is operated when the vehicle state determining means 102 determines that the shift position is the D position, the shift control means 104 temporarily changes the shift mode from the automatic shift mode to the manual shift mode and outputs to the hydraulic control circuit 36 the oil pressure command signal Sp changing a plurality of the shift stages set and stored in advance corresponding to a plurality of stepwise gear ratios in the automatic transmission 20 depending on a shift operation of the paddle switch 54 by a user. As a result, a switch is made to the desired shift stage corresponding to the user operation in a temporary manual shift mode at the time of the D position. The shift control means 104 determines whether an automatic return condition for automatically returning from the temporary manual shift mode to the automatic shift mode is satisfied in the temporary manual shift mode at the time of the D position, for example, and if the automatic return condition is satisfied, the shift control means 104 returns the shift mode to the automatic shift mode of the D position. The automatic return condition is satisfied, for example, when an acceleration-on state continues for a certain time or longer at the same shift stage in the temporary manual shift mode, when the selected shift stage results in insufficient acceleration because of a larger accelerator opening degree Acc, or when the vehicle 10 stops.

A hybrid control portion, i.e., a hybrid control means 106 has a function as an engine drive control means controlling the drive of the engine 14, a function as a rotating machine activation control means controlling activation of the first motor generator MG1 and the second motor generator MG2 as the drive power source or the electric generator via the inverter 26, and a function as a clutch control means controlling activation of the first clutch C1 and the second clutch C2 via the hydraulic control circuit 36, and provides the hybrid drive control etc., by the engine 14 and the rotating machines MG through these control functions. For example, the hybrid control means 106 switches a plurality of types of the running mode depicted in FIG. 5 for running.

Specifically, in FIG. 5, in the EV running mode, both the first clutch C1 and the second clutch C2 are put into the released state (i.e., the coupling of the power transmission path is put into the interrupted state) to separate the engine 14 from the drive power transmission path and, while the engine 14 is stopped with the first motor generator MG1 put into a no-load state (a free rotation state with torque set to zero), the second motor generator MG2 is subjected to power running control for forward or backward running. In the series HEV running mode, both the first clutch C1 and the second clutch C2 are put into the released state to separate the engine 14 from the drive power transmission path and, while the engine 14 is activated to rotationally drive the first motor generator MG1 and the first motor generator MG1 is subjected to electric generation control (i.e., regenerative control), the second motor generator MG2 is subjected to the power running control for forward or backward running as is the case with the EV running mode. In this case, the electric power acquired by the first motor generator MG1 is supplied to the second motor generator MG2 or used for charging the electric storage device 28. The power running control means that the motor generator is used as an electric motor and the electric generation control means that the motor generator is used as an electric generator. In the example of FIG. 5, both the first clutch C1 and the second clutch C2 are put into the released state to separate the engine 14 from the drive power transmission path; however, at least one of the first clutch C1 and the second clutch C2 may be put into the released state. As described above, the EV running mode and the series HEV running mode are running modes enabling the motor running using only the second motor generator MG2 as the drive power source with at least one of the first clutch C1 and the second clutch C2 released.

The parallel HEV running mode is a running mode in which both the first clutch C1 and the second clutch C2 are put into the engaged state (i.e., the coupling of the power transmission path is put into the connected state) to connect the engine 14 to the drive power transmission path for running using at least the engine 14 as the drive power source, and includes three sub-modes of parallel HEV [1] to [3]. In a first sub-mode, i.e., the parallel HEV [1] (narrowly-defined parallel HEV running mode), the engine 14 is activated and the first motor generator MG1 is subjected to the power running control for running using the engine 14 and the first motor generator MG1 as the drive power sources, while the second motor generator MG2 is put into the no-load state. In the parallel HEV [1], the second motor generator MG2 may be subjected to the power running control instead of the first motor generator MG1 or both the first motor generator MG1 and the second motor generator MG2 may be subjected to the power running control to generate the drive power. In a second sub-mode, i.e., the parallel HEV [2] (series parallel HEV running mode), the engine 14 is activated and the second motor generator MG2 is subjected to the power running control for running using the engine 14 and the second motor generator MG2 as the drive power sources, while the first motor generator MG1 is subjected to the electric generation control. In this case, the electric power acquired by the first motor generator MG1 is supplied to the second motor generator MG2 or used for charging the electric storage device 28. In the parallel HEV [2], the first motor generator MG1 may be subjected to the power running control and used as the drive power source while the second motor generator MG2 may be subjected to the electric generation control. A third sub-mode, i.e., the parallel HEV [3] (engine running mode) is a running mode in which the engine 14 is activated for running using only the engine 14 as the drive power source, and both the first motor generator MG1 and the second motor generator MG2 are put into the no-load state.

The parallel HEV [1] can generate larger drive power as compared to the parallel HEV [3] and, for example, at the time of an acceleration request or at the time of high-speed running associated with an increased accelerator opening degree Acc, the first motor generator MG1 is subjected to the power running control in an assistive manner, thereby promptly switching the parallel HEV [3] to the parallel HEV [1]. Although the parallel HEV [2] is implemented in the same way as the parallel HEV [1], for example, if the charged capacity SOC of the electric storage device 28 is relatively larger, the parallel HEY [1] is performed and, if the charged capacity SOC is relatively smaller, the parallel HEV [2] is performed.

Figure 6:
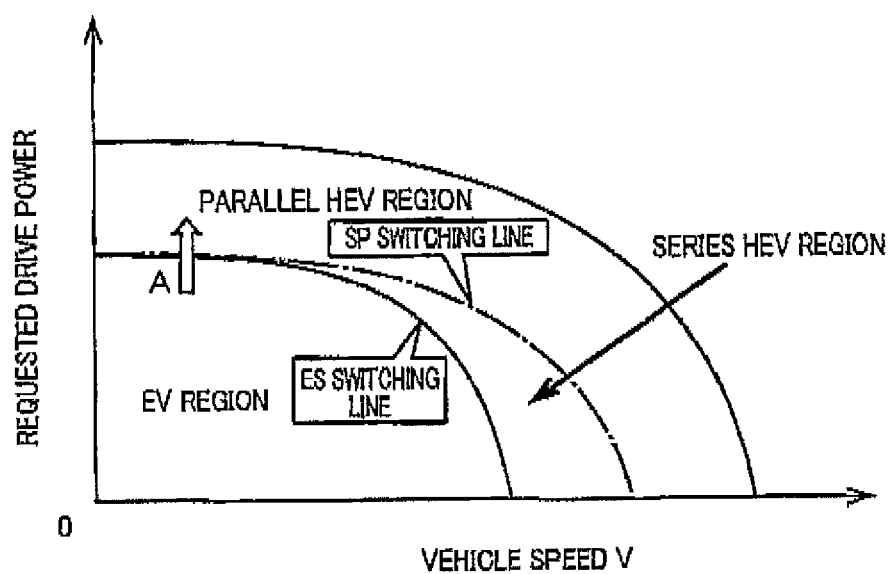
FIG. 6 is a diagram of an example of a mode switching map switching an EV running mode, a series HEV running mode, and a parallel HEV running mode.

The hybrid control means 106 switches the EV running mode, the series HEV running mode, and the parallel HEV running mode for running in accordance with a predetermined mode switching condition. The mode switching condition is set in advance as a two-dimensional mode switching map using a requested drive power such as the accelerator opening degree Acc and the vehicle speed V as parameters, for example, as depicted in FIG. 6; an EV region for running in the EV running mode is defined on the side of lower requested drive power and lower vehicle speed relative to an ES switching line (solid line); a series HEV region for running in the series HEV running mode is defined between the ES switching line and an SP switching line (dashed-dotted line); and a parallel HEV region for running in the parallel HEV running mode is defined on the side of higher requested drive power and higher vehicle speed relative to the SP switching line. A hysteresis (not depicted) is disposed for each of these switching lines so as to prevent frequent switching of the running mode due to slight changes in the vehicle speed or the requested drive power.

The hybrid control means 106 implements a deceleration running mode during the deceleration running with an accelerator turned off when the accelerator opening degree Acc is determined as zero. For example, in the deceleration running mode when the deceleration running is performed during the motor running in the EV running mode or the series HEV running mode, as depicted in FIG. 5, both the first clutch C1 and the second clutch C2 are kept in the released state, and the second motor generator MG2 in the power running control is subjected to the electric generation control (regenerative control), making a braking force to act on the vehicle 10 due to a rotational resistance from the electric generation control (i.e., generating the vehicle deceleration) and charging the electric storage device 28 with generated electric energy. In the deceleration running mode when the deceleration running is performed during running in the parallel HEV running mode (not depicted), while both the first clutch C1 and the second clutch C2 are kept in the engaged state, each of the first motor generator MG1 and the second motor generator MG2 are put into the no-load state or subjected to the electric generation control, making an engine braking force to act on the vehicle 10 due to at least a rotational resistance of the engine 14 (i.e., generating the vehicle deceleration).

The vehicle 10 of this example includes the manual shift mode as a shift mode in addition to the automatic shift mode. Therefore, during the motor running (the EV running mode, the series HEV running mode), when the vehicle deceleration is more generated depending on the downshift operation (deceleration increasing operation) by a user using the shift lever 50 or the paddle switch 54 in the manual shift mode, a load of the second motor generator MG2 increases and the temperature of the second motor generator MG2 tends to rise as compared to the automatic shift mode. In other words, since the vehicle deceleration must be generated only by the second motor generator MG2 during the motor running, the second motor generator MG2 tends to be in a thermally severe condition. Therefore, cooling control or some device related to cooling for suppressing the temperature increase in the second motor generator MG2 is considered to be necessary during the motor running in preparation for a shift to the manual shift mode. On the other hand, the manual shift mode includes the case that a change is made when the M position is selected with the shift lever 50 and the case that a change is temporarily made with the shift operation using the paddle switch 54 when the D position is selected by the shift lever 50. For example, the vehicle 10 of this example enables selection of a first manual mode in which the vehicle deceleration can be increased through the downshift operation (deceleration increasing operation) using the paddle switch 54 (particularly, the downshift switch 60) by a user while the D position is selected and a second manual mode in which the vehicle deceleration can be increased through the downshift operation using the paddle switch 54 by a user while the M position is selected. Therefore, even in the same manual shift mode, it is believed that the temperature increase in the second motor generator MG2 is suppressed in the first manual mode achieved by a temporary shift to the manual shift mode and automatically returned to the automatic shift mode while the D position is selected, as compared to the second manual mode that is the continuing manual shift mode while the M position is selected. Therefore, if the cooling performance of the second motor generator MG2 is ensured for the second manual mode while the M position is selected, the cooling performance may be excessive and cause deterioration in fuel efficiency or increase cost in the first manual mode while the D position is selected. The operation of the paddle switch 54 by a user during the D position will be referred to as a D-paddle operation and the operation of the paddle switch 54 by a user during the M position will be referred to as an M-paddle operation.

Therefore, to suppress a heat generation amount of the second motor generator MG2 without ensuring excessive cooling performance of the second motor generator MG2 in preparation for the activation of the second motor generator MG2 in the manual shift mode, when the vehicle 10 is running with the engine 14 interrupted from the front drive wheels 16 (i.e., during the motor running), if the first manual mode is selected (i.e., if the downshift operation through the D-paddle operation is performed), the electronic control device 100 of this example allows only the second motor generator MG2 to generate the vehicle deceleration and, on the other hand, if the second manual mode is selected (i.e., if the downshift operation through the M-paddle operation is performed), the electronic control device 100 puts both the first clutch C1 and the second clutch C2 into the engaged state to allow at least the engine 14 to generate the vehicle deceleration. In short, since the first manual mode achieved by the downshift operation through the D-paddle operation is the temporary manual shift mode automatically returning to the automatic shift mode and hardly increases the temperature of the second motor generator MG2, only the second motor generator MG2 is used for generating the vehicle deceleration and, on the other hand, since the second manual mode achieved by the downshift operation through the M-paddle operation is the continuing manual shift mode and may put the second motor generator MG2 into a thermally severe condition, the engine 14 is used for generating the vehicle deceleration.

More specifically, returning to FIG. 4, the vehicle state determining means 102 determines, for example, whether the deceleration running during the motor running is being performed by the hybrid control means 106, based on whether the accelerator is turned off during the motor running.

A paddle operation determining portion, i.e., a paddle operation determining means 108 determines, for example, whether the downshift operation using the paddle switch 54 is performed, based on the signal indicative of the switch operation $S_{DN}$ of the downshift switch 60.

If the vehicle state determining means 102 determines that the deceleration running during the motor running is being performed and that the shift position $P_{SH}$ is the M position, i.e., if the D position is switched to the M position, the hybrid control means 106 keeps the second clutch C2 in the released state and puts the first clutch C1 into the engaged state. This is because if the downshift operation is performed through the M-paddle operation, both the first clutch C1 and the second clutch C2 must be put into the engaged state and, therefore, when the M position is selected, only the first clutch C1 is put into the engaged state in advance in preparation for the downshift operation through the M-paddle operation. The first clutch C1 is put into the engaged state between the first clutch C1 and the second clutch C2 because if the second clutch C2 is put into the engaged state, an inertia part of the automatic transmission 20 is raised and the vehicle deceleration may be generated on the front drive wheel 16 side. The first clutch C1 may not necessarily be put into the engaged state. In other words, the first clutch C1 and the second clutch C2 may be maintained in the released state without change or the second clutch C2 may be put into the engaged state.

After the M position is selected and the first clutch C1 is put into the engaged state, if the vehicle state determining means 102 determines that the shift position $P_{SH}$ is not the M position, the hybrid control means 106 returns the first clutch C1 to the released state. On the other hand, after the M position is selected and the first clutch C1 is put into the engaged state, when the vehicle state determining means 102 determines that the shift position $P_{SH}$ is the M position, if the paddle operation determining means 108 determines that the downshift operation using the paddle switch 54 is performed, the hybrid control means 106 puts the second clutch C2 into the engaged state to generate the vehicle deceleration with an engine brake by the engine 14. In this case, since the running mode is put into the state equivalent to the parallel HEV running mode, at least one of the first motor generator MG1 and the second motor generator MG2 may be used for generating the desired vehicle deceleration along with the engine 14. The motor running includes two running modes, i.e., the EV running mode in which the engine 14 is stopped and the series HEV running mode in which the engine 14 is operated. Therefore, when the parallel HEV running mode is achieved from the EV running mode, the engine 14 is made rotated from the front drive wheel 16 side without igniting the engine 14, thereby making the engine brake to act while the engine rotation speed $N_E$ is raised. However, since a deceleration shock may be increased (the vehicle deceleration may excessively be generated), for example, the engine braking force may be controlled through torque capacity control of the second clutch C2, or the raising of the engine rotation speed $N_E$ may be assisted through the power running control of the first motor generator MG1 until a synchronous rotation speed of the engine 14. When the parallel HEV running mode is achieved from the series HEV running mode, a fuel cut of the engine 14 is performed while the engine rotation speed $N_E$ is set to the synchronous rotation speed (or the synchronous rotation speed+a predetermined margin) through the rotation control of the engine 14 itself (or the rotation control of the engine 14 itself and the control of the first motor generator MG1), and the second clutch C2 is subsequently promptly put into the engaged state. The synchronous rotation speed of the engine 14 is the engine rotation speed $N_E$ at the shift stage requested by the M-paddle operation and is uniquely calculated from the transmission output rotation speed $N_{OUT}$ and the gear ratio of the automatic transmission 20 corresponding to the requested shift stage.

When the vehicle state determining means 102 determines that the deceleration running during the motor running is being performed and that the shift position $P_{SH}$ is the D position, if the paddle operation determining means 108 determines that the downshift operation using the paddle switch 54 is performed, the hybrid control means 106 provides the electric generation control of the second motor generator MG2 to generate the desired vehicle deceleration only with the second motor generator MG2.

As described above, the motor running includes two running modes, i.e., the EV running mode in which the engine 14 is stopped and the series HEV running mode in which the engine 14 is operated. Therefore, even though the rotation of the engine 14 is stopped in the EV running mode, the downshift operation through the D-paddle operation may increase the vehicle deceleration, generating an uncomfortable feeling. Therefore, to give a user a feeling as if an engine brake is acting so as to suppress the uncomfortable feeling due to an increase in the vehicle deceleration, the hybrid control means 106 starts the engine 14 in the case of the EV running mode at the time of the downshift operation through the D-paddle operation. In other words, a shift to the series HEV running mode is made. Since the originally stopped engine 14 is intentionally started in the case of the EV running mode, the engine rotation speed $N_E$ after the start is made lower in the EV running mode as compared to the case of the series HEV running mode so as to suppress the uncomfortable feeling of a user.

When the shift lever 50 is operated to the M position at the time of the first manual mode after the downshift operation through the D-paddle operation, a state substantially equivalent to the downshift operation through the M-paddle operation (i.e., the second manual mode) is achieved. Therefore, when the shift control means 104 determines that the automatic return condition to the automatic shift mode is not yet satisfied after the downshift operation through the D-paddle operation, if the vehicle state determining means 102 determines that the shift position $P_{SH}$ is the M position, the hybrid control means 106 puts both the first clutch C1 and the second clutch C2 into the engaged state to allow the engine 14 to generate the vehicle deceleration as is the case with the downshift operation through the M-paddle operation. The engine 14 is started at the time of the downshift operation through the D-paddle operation during the EV running mode as described above also in preparation for when the M position is selected during the first manual mode. In particular, if the engine brake is allowed to act by making the engine 14 rotated as in the case of the downshift operation through the M-paddle operation during the EV running mode as described above, a deceleration shock tends to occur. Therefore, at the time of the downshift operation through the D-paddle operation during the EV running mode, the engine 14 is started in advance and, if the M position is selected during the subsequent first manual mode, the engine rotation speed $N_E$ is set to the synchronous rotation speed through the rotation control of the engine 14 itself (or the rotation control of the engine 14 itself and the control of the first motor generator MG1) as in the case of the downshift operation through the M-paddle operation during the series HEV running mode.

Specifically, if the downshift operation through the D-paddle operation is performed, the hybrid control means 106 keeps the second clutch C2 in the released state and puts the first clutch C1 into the engaged state in addition to allowing only the second motor generator MG2 to generate the desired vehicle deceleration. This is because if the M position is selected when the first manual mode due to the downshift operation through the D-paddle operation is continued, both the first clutch C1 and the second clutch C2 must be put into the engaged state and, therefore, only the first clutch C1 is put into the engaged state in advance in preparation for the operation to the M position. As described above, the reason why the first clutch C1 is put into the engaged state between the first clutch C1 and the second clutch C2 is because if the second clutch C2 is put into the engaged state, the inertia part of the automatic transmission 20 is raised. The first clutch C1 may not necessarily be put into the engaged state. In other words, the first clutch C1 and the second clutch C2 may be maintained in the released state without change or the second clutch C2 may be put into the engaged state.

When the first manual mode is continued after the downshift operation through the D-paddle operation, if the M position is selected, the hybrid control means 106 puts the second clutch C2 into the engaged state to generate the vehicle deceleration with the engine brake by the engine 14. In this case, since the running mode is put into the state equivalent to the parallel HEV running mode, at least one of the first motor generator MG1 and the second motor generator MG2 may be used for generating the desired vehicle deceleration along with the engine 14. When the parallel HEV running mode is achieved from the EV running mode, the engine 14 is maintained at lower rotation (e.g., idle rotation speed) at the time of the downshift operation through the D-paddle operation and, therefore, a fuel cut of the engine 14 is performed while the engine rotation speed $N_E$ is set to the synchronous rotation speed through the rotation control of the engine 14 itself (or the rotation control of the engine 14 itself and the control of the first motor generator MG1), and the second clutch C2 is subsequently promptly put into the engaged state. When the parallel HEV running mode is achieved from the series HEV running mode, after the engine rotation speed $N_E$ is set to the synchronous rotation speed for standby through the rotation control of the engine 14 itself (or the rotation control of the engine 14 itself and the control of the first motor generator MG1) at the time of the downshift operation through the D-paddle operation, a fuel cut of the engine 14 is performed when the M position is selected, and the second clutch C2 is subsequently promptly put into the engaged state. The synchronous rotation speed of the engine 14 is the engine rotation speed $N_E$ at the shift stage requested by the D-paddle operation and is uniquely calculated from the transmission output rotation speed $N_{OUT}$ and the gear ratio γ of the automatic transmission 20 corresponding to the requested shift stage.

Figure 7:
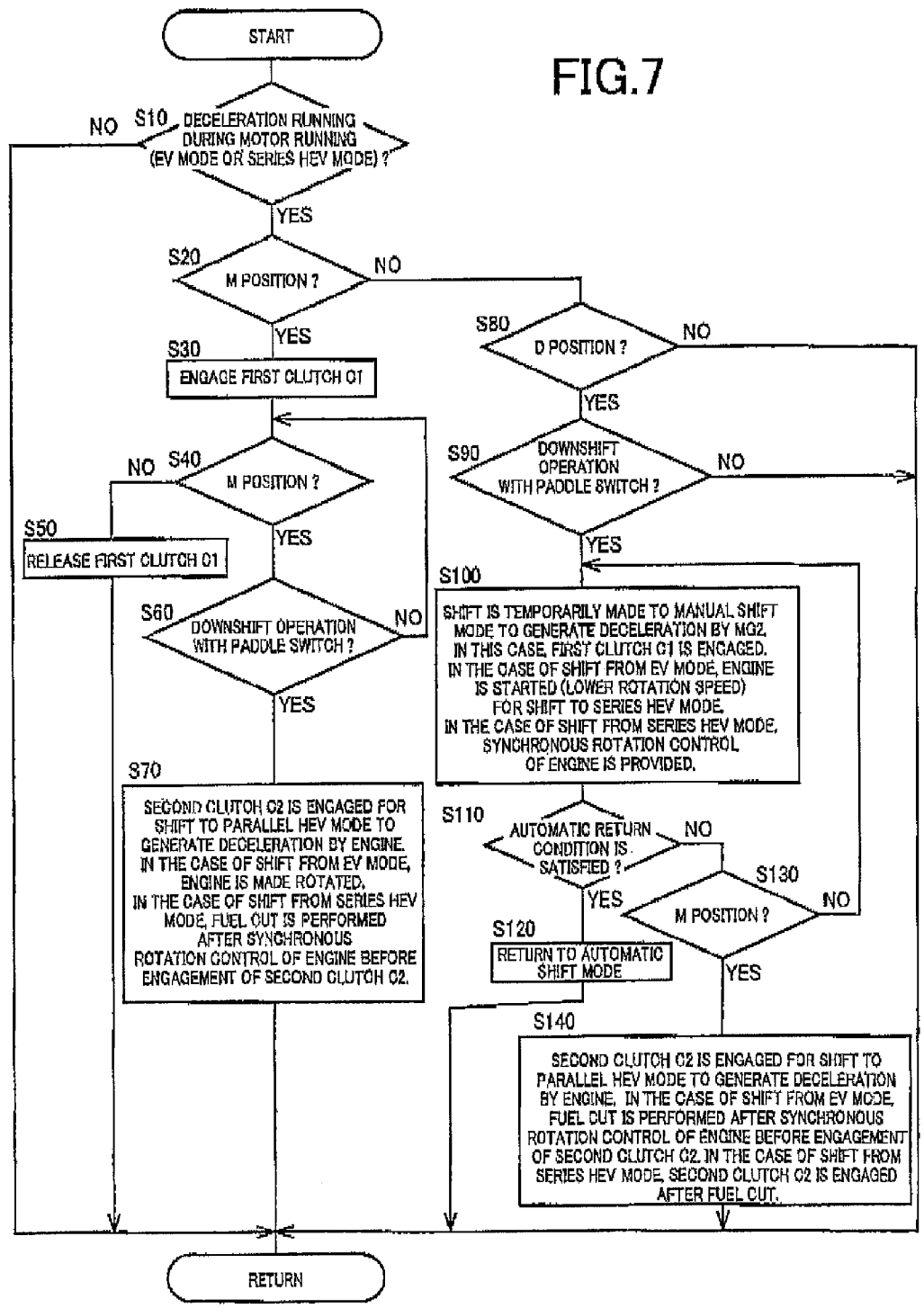
FIG. 7 is a flowchart for explaining a main portion of the control operation of the electronic control device, i.e., a control operation for properly suppressing heat generation of a second motor generator at the time of user operation increasing the vehicle deceleration during the motor running.

FIG. 7 is a flowchart for explaining a main portion of the control operation of the electronic control device 100, i.e., a control operation for properly suppressing heat generation of the second motor generator MG2 at the time of user operation increasing the vehicle deceleration during the motor running, and is repeatedly executed with an extremely short cycle time, for example, on the order of a few msec to a few tens of msec.

In FIG. 7, first, at step (hereinafter, step will be omitted) S10 corresponding to the vehicle state determining means 102, for example, it is determined whether the deceleration running during the motor running (the EV running mode, the series HEV running mode) is being performed. If the determination of S10 is negative, this routine is terminated and, if the determination of S10 is affirmative, at S20 corresponding to the vehicle state determining means 102, for example, it is determined whether the shift position $P_{SH}$ of the shift lever 50 is the M position. If the determination of S20 is affirmative, at S30 corresponding to the hybrid control means 106, for example, the first clutch C1 is put into the engaged state. At S40 corresponding to the vehicle state determining means 102, for example, it is determined whether the shift position $P_{SH}$ of the shift lever 50 is the M position. If the determination of S40 is negative, at S50 corresponding to the hybrid control means 106, for example, the first clutch C1 is put into the released state. Conversely, if the determination of S40 is affirmative, at S60 corresponding to the paddle operation determining means 108, for example, it is determined whether the downshift operation using the paddle switch 54 is performed, based on the signal indicative of the switch operation $S_{DN}$ of the downshift switch 60. If the determination of S60 is negative, the operation returns to S40 and, if the determination of S60 is affirmative, at S70 corresponding to the hybrid control means 106, for example, the second clutch C2 is put into the engaged state to substantially make the shift to the parallel HEV running mode and the vehicle deceleration is generated with the engine brake by the engine 14. In this case, if the shift is made from the EV running mode, the second clutch C2 is promptly put into the engaged state and the engine 14 is made rotated from the front drive wheel 16 side, thereby making the engine brake to act while the engine rotation speed $N_E$ is raised. If the shift is made from the series HEV running mode, a fuel cut of the engine 14 is performed while the engine rotation speed $N_E$ is set to the synchronous rotation speed before the second clutch C2 is put into the engaged state.

On the other hand, if the determination of S20 is negative, at S80 corresponding to the vehicle state determining means 102, for example, it is determined whether the shift position $P_{SH}$ of the shift lever 50 is the D position. If the determination of S80 is negative, this routine is terminated and, if the determination of S80 is affirmative, at S90 corresponding to the paddle operation determining means 108, for example, it is determined whether the downshift operation using the paddle switch 54 is performed, based on the signal indicative of the switch operation $S_{DN}$ of the downshift switch 60. If the determination of S90 is negative, this routine is terminated and, if the determination of S90 is affirmative, at S100 corresponding to the shift control means 104 and the hybrid control means 106, for example, the shift mode is temporarily shifted from the automatic shift mode to the manual shift mode and the second motor generator MG2 is subjected to the electric generation control, thereby allowing only the second motor generator MG2 to generate the desired vehicle deceleration. In this case, the first clutch C1 is put into the engaged state in preparation for the operation to the M position. If the EV running mode is used at this point, although the engine 14 is started the engine rotation speed $N_E$ after the start is made lower as compared to the case of the series HEV running mode. If the series HEV running mode is used at this point, the engine rotation speed $N_E$ is set to the synchronous rotation speed for standby. Subsequently, at S110 corresponding to the shift control means 104, for example, it is determined whether the automatic return condition to the automatic shift mode is satisfied. If the determination of S110 is affirmative, at S120 corresponding to the shift control means 104, for example, the shift mode is returned to the automatic shift mode at the D position. Conversely, if the determination of S110 is negative, at S130 corresponding to the vehicle state determining means 102, for example, it is determined whether the shift position $P_{SH}$ of the shift lever 50 is the M position. If the determination of S130 is negative, the operation returns to S100 and, if the determination of S130 is affirmative, at S140 corresponding to the hybrid control means 106, for example, the second clutch C2 is put into the engaged state to substantially make the shift to the parallel HEV running mode and the vehicle deceleration is generated with the engine brake by the engine 14. In this case, if the shift is made from the EV running mode, the engine 14 is already started at S100 to implement the series HEV running mode and, therefore, a fuel cut of the engine 14 is performed while the engine rotation speed $N_E$ is set to the synchronous rotation speed before the second clutch C2 is put into the engaged state. If the shift is made from the series HEV running mode, the engine rotation speed $N_E$ is already set to the synchronous rotation speed at S100 and, therefore, a fuel cut of the engine 14 is performed before the second clutch C2 is put into the engaged state.

As described above, according to this example, during the motor running (the EV running mode, the series HEV running mode), if the first manual mode is selected (if the downshift operation through the D-paddle operation is performed), the vehicle deceleration is generated only by the second motor generator MG2 and, on the other hand, if the second manual mode is selected (i.e., if the downshift operation through the M-paddle operation is performed), both the first clutch C1 and the second clutch C2 are put into the engaged state to generate the vehicle deceleration at least by the engine 14; therefore, in the case of the first manual mode, since the temporary manual shift mode is achieved, the temperature of the second motor generator MG2 hardly increases even if the vehicle deceleration is generated only by the second motor generator MG2; and, on the other hand, in the case of the second manual mode that is the continuing manual shift mode and that may put the second motor generator MG2 into a thermally severe condition, the load of the second motor generator MG2 can be reduced to suppress the excessive heat generation of the second motor generator MG2. Therefore, during the motor running, the heat generation of the second motor generator MG2 can properly be suppressed at the time of the user operation increasing the vehicle deceleration. From a different viewpoint, since the first manual mode is the temporary manual shift mode automatically returning to the automatic shift mode and hardly increases the temperature of the second motor generator MG2, only the second motor generator MG2 is used for generating the vehicle deceleration and, on the other hand, since the second manual mode is the continuing manual shift mode and may put the second motor generator MG2 into a thermally severe condition, the engine 14 is mainly used for generating the vehicle deceleration, thereby eliminating the need for ensuring the excessive cooling performance of the second motor generator MG2. As a result, equipment related to the cooling of the second motor generator MG2 can be simplified.

According to this example, in the case of the EV running mode without the activation of the engine 14 when the first manual mode is selected, the engine 14 is started while at least one of the first clutch C1 and the second clutch C2 is kept in the released state so as to make the shift to the series HEV running mode and, therefore, even though the vehicle deceleration is actually generated only by the second motor generator MG2, it feels as if the engine brake is working as in the vehicle using only the engine 14 as the drive power source and an uncomfortable feeling from the generation (increase) of the vehicle deceleration hardly occurs. Alternatively, for example, if the M position is selected at the time of the first manual mode after the downshift operation through the D-paddle operation and the second manual mode associated with the downshift operation through the M-paddle operation is substantially achieved, the engine 14 can promptly be used for generating the vehicle deceleration. Therefore, for example, if the M position is selected after the downshift operation through the D-paddle operation, one step from the series HEV running mode→the parallel HEV running mode is formed rather than going through two steps from the EV running mode→the series HEV running mode→the parallel HEV running mode and, therefore, responsiveness (response) is improved.

According to this example, in the case of the EV running mode with the engine 14 stopped at the time of the downshift operation through the D-paddle operation, the engine rotation speed $N_E$ after the start is made lower as compared to the case of the series HEV running mode with the engine 14 already activated and this suppresses an uncomfortable feeling due to engine start during the motor running in which the engine 14 is originally not activated.

According to this example, if the M position is selected when the first manual mode due to the downshift operation through the D-paddle operation is continued, both the first clutch C1 and the second clutch C2 are put into the engaged state to allow the engine 14 to generate the vehicle deceleration and, therefore, if the M position is selected during the temporary manual shift mode due to the D-paddle operation, it is considered that the downshift operation through the M-paddle operation is substantially performed.

According to this example, if the downshift operation through the D-paddle operation is performed, the first clutch C1 is engaged while the second clutch C2 is kept released and, if the M position is selected while the first manual mode due to the downshift operation through the D-paddle operation is continued, the second clutch C2 is engaged and, therefore, if the downshift operation through the D-paddle operation is performed, the power transmission path between the engine 14 and the front drive wheels 16 is maintained in the interrupted state to allow only the second motor generator MG2 to generate the vehicle deceleration and, if the M position is selected while the first manual mode is continued, the power transmission path can promptly be put into the connected state by simply engaging the second clutch C2 to allow the engine 14 to generate the vehicle deceleration. When the power transmission path is maintained in the interrupted state, if the second clutch C2 is engaged while the first clutch C1 is kept released, the inertia part of the automatic transmission 20 is applied to the front drive wheels 16 and a deceleration shock may occur; however, since the first clutch C1 is engaged while the second clutch C2 is kept released, such a deceleration shock does not occur.

According to this example, if the D position is switched to the M position, the first clutch C1 is engaged while the second clutch C2 is kept released and, if the downshift operation through the M-paddle operation is further performed, the second clutch C2 is engaged and, therefore, if the M position is selected while the automatic shift mode is continued, the power transmission path between the engine 14 and the front drive wheels 16 can be maintained in the interrupted state and, if the downshift operation through the M-paddle operation is performed, the power transmission path can promptly be put into the connected state by simply engaging the second clutch C2 and the vehicle deceleration can promptly be generated by the engine 14. When the power transmission path is maintained in the interrupted state, if the second clutch C2 is engaged while the first clutch C1 is kept released, the inertia part of the automatic transmission 20 is applied to the front drive wheels 16 and a deceleration shock may occur; however, since the first clutch C1 is engaged while the second clutch C2 is kept released, such a deceleration shock does not occur.

Other examples of the present invention will be described. In the following description, the portions common to the examples are denoted by the same reference numerals and will not be described.

Second Example

Figure 8:
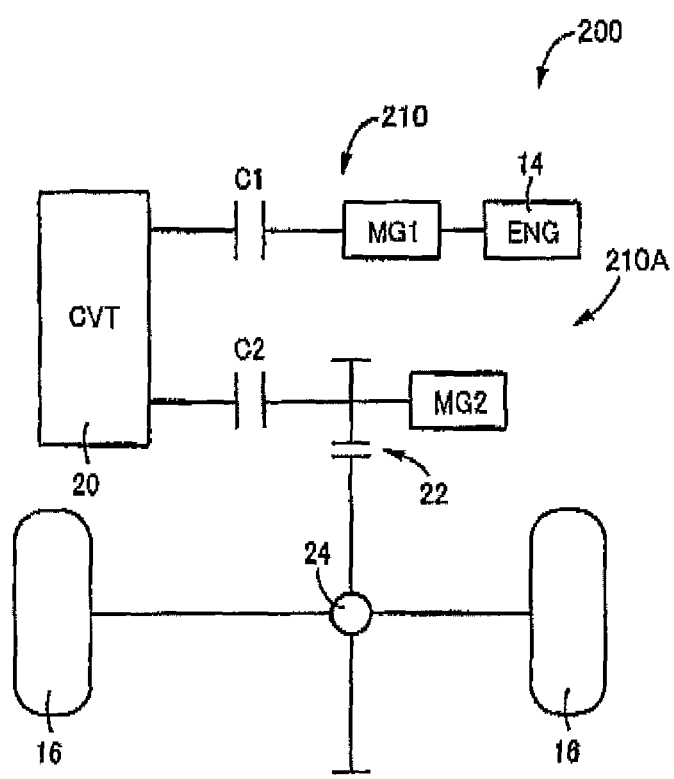
FIG. 8 is a diagram for explaining a general configuration of a power transmission path making up another hybrid vehicle to which the present invention is applied.

FIG. 8 is a diagram for explaining a general configuration of a power transmission path in a drive device 210 making up another hybrid vehicle 200 to which the present invention is applied. In FIG. 8, the drive device 210 includes a front drive portion 210A equipped with the engine 14, the first motor generator MG1, and the second motor generator MG2 to drive the front drive wheels 16. Therefore, the drive device 210 is different from the drive device 12 of the first example mainly in that the second motor generator MG2 is disposed to drive the front drive wheels 16 and that the rear drive portion driving the wheels on the rear side is not included. Thus, the wheels on the rear side is driven wheels rather than drive wheels in the hybrid vehicle 200.

The front drive portion 210A includes the engine 14 as well as the first motor generator MG1, the first clutch C1, the automatic transmission 20, the second clutch C2, the first gear pair 22, and the front differential gear device 24 disposed in this order from the engine 14 side and coupled to each other in series in the power transmission path between the engine 14 and the front drive wheels 16 and additionally includes the second motor generator MG2 coupled in a power transmittable manner to the output side (the front drive wheel 16 side) of the second clutch C2. As described above, the engine 14 is coupled to the front drive wheels 16 sequentially through the first motor generator MG1, the first clutch C1, the automatic transmission 20, the second clutch C2, the first gear pair 22, and the front differential gear device 24. The second motor generator MG2 is coupled to the front drive wheels 16 sequentially through the first gear pair 22 and the front differential gear device 24 and is disposed such that the drive power can be transmitted to the front drive wheels 16.

The hybrid vehicle 200 includes the electronic control device 100 as is the case with the vehicle 10 of the first example and switches various running modes depicted in FIG. 5 for running while the control operation is performed in accordance with the flowchart of FIG. 7. Therefore, substantially the same function effects as the first example are acquired in this example.

Third Example

FIG. 9 is a diagram for explaining yet another hybrid vehicle 250 to which the present invention is applied; (a) is a diagram of a general configuration; (b) is a diagram for explaining various running modes. In FIG. 9(a), the hybrid vehicle 250 has the engine 14, the first clutch C1, the first motor generator MG1, the second clutch C2, and the second motor generator MG2 coupled in series on a common axis, and an output gear 252 disposed between the second clutch C2 and the second motor generator MG2 is meshed with a ring gear 254 of the front differential gear device 24. The hybrid vehicle 250 does not include a so-called transmission such as a stepped transmission and a continuously variable transmission. As depicted in FIG. 9(b), the hybrid vehicle 250 enables the EV running mode, the series HEV running mode, the parallel HEV running mode having the three sub-modes, and the deceleration running mode as is the case with the first example and switches these running modes with the electronic control device 100 for running while the control operation is performed in accordance with the flowchart of FIG. 7.

In this example, the second clutch C2 separating the engine 14 from the drive power transmission path in the EV running mode and the series HEV running mode corresponds to the connection/disconnection device capable of connecting/interrupting the engine 14 and the first motor generator MG1 with respect to the front drive wheels 16. Therefore, the switching of the connection/disconnection device between connection and interruption is controlled by engagement and release of the second clutch C2. Thus, for example, in the flowchart of FIG. 7, if the motor running is performed in the series HEV running mode in which the first clutch C1 is always engaged, the control operation is not performed at steps S30 and S100 for putting the first clutch C1 into the engaged state with the second clutch C2 maintained in the released state. Therefore, substantially the same function effects as the first example are acquired in this example except the function effect acquired by the control operation not performed.

Fourth Example

FIG. 10 is a diagram for explaining further hybrid vehicle 260 to which the present invention is applied; (a) is a diagram of a general configuration; (b) is a diagram for explaining various running modes. In FIG. 10(a), the hybrid vehicle 260 has the engine 14, the first motor generator MG1, the second motor generator MG2, and an output gear 264 connected via a planetary gear device 262 and the first clutch C1 is disposed between the engine 14 and the first motor generator MG1 while the first motor generator MG1 is coupled via the second clutch C2 to a ring gear R of the planetary gear device 262. The ring gear R is non-rotatably fixed by a brake 266. The second motor generator MG2 is coupled to a sun gear S of the planetary gear device 262 and the output gear 264 is coupled to a carrier CA while the output gear 264 is meshed with a ring gear 268 of the front differential gear device 24. As depicted in FIG. 10(b), the hybrid vehicle 260 enables the EV running mode, the series HEV running mode, the parallel HEV running mode, and the deceleration running mode as is the case with the first example and switches these running modes with the electronic control device 100 for running while the control operation is performed in accordance with the flowchart of FIG. 7.

In this example, the second clutch C2 separating the engine 14 from the drive power transmission path in the EV running mode and the series HEV running mode corresponds to the connection/disconnection device capable of connecting/interrupting the engine 14 and the first motor generator MG1 with respect to the front drive wheels 16. Therefore, the switching of the connection/disconnection device between connection and interruption is controlled by engagement and release of the second clutch C2. Thus, for example, in the flowchart of FIG. 7, if the motor running is performed in the series HEV running mode in which the first clutch C1 is always engaged, the control operation is not performed at steps S30 and S100 for putting the first clutch C1 into the engaged state with the second clutch C2 maintained in the released state. Therefore, substantially the same function effects as the first example are acquired in this example except the function effect acquired by the control operation not performed.

In FIG. 10(b), in the EV running mode, the brake 266 is fixed and the second motor generator MG2 is subjected to the power running control for running; however, while the brake 266 is released and the second clutch C2 is connected, both the first motor generator MG1 and the second motor generator MG2 can be subjected to the power running control for running. In the parallel HEV running mode, two sub-modes of parallel HEV [1] and [2] can be used and the parallel HEV [1] on the upper side is the narrowly-defined parallel HEY running mode for running using both the engine 14 and the second motor generator MG2 as the drive power sources. The parallel HEV [2] on the lower side is the series parallel HEV running mode and the first motor generator MG1 is subjected to the electric generation control in the parallel HEV [1].

Although the examples of the present invention have been described in detail with reference to the drawings, the present invention can be implemented by combining the examples with each other and is applied in other forms.

For example, in the examples, if the first manual mode is selected, the vehicle deceleration is generated only by the second motor generator MG2 and, if the second manual mode is selected, the vehicle deceleration is generated at least by the engine 14. From another viewpoint, focusing on the torque capacity of the connection/disconnection device, if the vehicle deceleration is increased by performing the deceleration increasing operation increasing the vehicle deceleration with the paddle switch 54 (the downshift switch 60) when the M position is selected with the shift lever 50 (i.e., by performing the downshift operation through the M-paddle operation) during the motor running, the torque capacity of the connection/disconnection device is made larger as compared to the case that the vehicle deceleration is increased with the engine 14 kept interrupted from the front drive wheels 16 by performing the deceleration increasing operation increasing the vehicle deceleration with the paddle switch 54 (the downshift switch 60) when the D position is selected with the shift lever 50 (i.e., by performing the downshift operation through the D-paddle operation). For example, in the first and second examples, if the second manual mode is achieved during the motor running, the torque capacity of the second clutch C2 is made larger in the torque capacity control of the second clutch C2 while the first clutch C1 is put into the engaged state, as compared to the first manual mode in which both the first clutch C1 and the second clutch C2 are put into the released state. The same function effects as the examples can be acquired in this way.

Although the vehicle deceleration is generated at least by the engine 14 in the case of the second manual mode (the downshift operation through the M-paddle operation) in the examples, after the engine 14 is connected to the wheels, an additional downshift operation may be supported by increasing the regeneration amount of the second motor generator MG2, for example. In the case of the vehicle including the automatic transmission 20, the automatic transmission 20 may be downshifted to increase the engine braking force or the regeneration amount of the second motor generator MG2 may be increased.

Although the vehicle deceleration is generated at least by the engine 14 in the case of the second manual mode (the downshift operation through the M-paddle operation) in the examples, for example, the engine brake may eventually be used together in accordance with the M-paddle operation. Specifically, the vehicle deceleration may be generated by the second motor generator MG2 for a first downshift operation through the M-paddle operation and the engine brake may be used together for a second downshift operation through the M-paddle operation. Alternatively, the vehicle deceleration may be generated by the second motor generator MG2 immediately after the downshift operation through the M-paddle operation and, after a predetermined time has elapsed from the downshift operation, the regeneration amount of the second motor generator MG2 may be reduced to use the engine brake together. For example, the predetermined time is a time considering a delay in generation of the engine brake obtained in advance.

Although the M-paddle operation is used for the shift to the second manual mode that is the continuing manual shift mode in the examples, the shift to the second manual mode may be made by an operation of the shift lever 50 at the M position to the upshift position "+" or the downshift position "−". For example, if a switching operation of a mode change-over switch can be used for the sift to the manual shift mode equivalent to the M position while the D position is maintained, after the manual shift mode is selected with the mode change-over switch at the D position, the paddle switch 54 may be operated to make the shift to the second manual mode.

Although the present invention is applied to the hybrid vehicle including the first motor generator MG1 coupled to the engine 14, the connection/disconnection device capable of connecting/interrupting the engine 14 and the first motor generator MG1 with respect to the wheels, and the second motor generator MG2 disposed such that the drive power can be transmitted to the wheels in the examples, this is not necessarily a limitation. For example, it is only necessary to include a rotating machine disposed such that the drive power can be transmitted to the wheels and, for example, the present invention is applicable to a vehicle including only the second motor generator MG2 as the rotating machine without including the first motor generator MG1.

Although the first motor generator MG1 is disposed between the engine 14 and the first clutch C1 in the first and second examples, this is not a limitation and, for example, the engine 14 may be disposed between the first motor generator MG1 and the first clutch C1.

Although the automatic transmission 20 is a belt type continuously variable transmission in the first and second examples, this is not a limitation and, for example, the automatic transmission 20 may be another known transmission such as a planetary gear type stepped automatic transmission and a parallel shaft type automatic (or manual) transmission. The automatic transmission 20 may not necessarily be included.

Although the first clutch C1 and the second clutch C2 are included as the connection/disconnection device capable of connecting/interrupting the engine 14 with respect to the wheels in the first and second examples, this is not necessarily a limitation. For example, it is only necessary to include at least one engagement device capable of connecting/interrupting the engine 14 with respect to the wheels as the connection/disconnection device. If the automatic transmission 20 is a belt type continuously variable transmission as in the first and second examples, a known forward/backward switching device may be used that can switch the output rotation between the positive side and the negative side relative to the input rotation through engagement operations of a clutch C and a brake B, instead of the first clutch C1. In this case, the clutch C and the brake B correspond to the first clutch C1. For example, if the automatic transmission 20 is a planetary gear type automatic transmission, the first clutch C1 may be an engagement device that is disposed between the engine 14 and the transmission output shaft 35, that makes up a portion of the planetary gear type automatic transmission, and that can be released to put the planetary gear type automatic transmission into the neutral state.

Although the manual shift mode is a gear-stage-fixed mode in which a shift stage (gear stage) is specified in accordance with an operation of the shift lever 50 or the paddle switch 54 in the examples, for example, the manual shift mode may be a shift-range-fixed mode in which a so-called manual range is set that limits the use of a shift stage on the high speed side (high vehicle speed side) in the automatic shift control.

Although the fuel cut of the engine 14 is performed if the engine brake is allowed to act to generate the vehicle deceleration in the parallel HEV running mode in the examples, for example, it is only necessary to achieve a driven state in which the engine torque becomes smaller than at least the torque input from the front drive wheel 16 side to the engine 14 side and, therefore, the fuel cut may not necessarily be performed.

In the third example, the hybrid vehicle 250 may not necessarily include the first clutch C1. The hybrid vehicle 250 may include a speed-increasing gear (e.g., a gear pair having a gear ratio that is a high-speed-side gear ratio (high gear ratio) smaller than one) closer to the engine 14 than the output gear 252 and may be configured such that the power of the engine 14 is transmitted via the speed-increasing gear to the output gear 252. With such a configuration, for example, while the motor running is performed during low-speed running, the engine running (running in the parallel HEV running mode including assist running using a motor generator MG) can more properly be performed during high-speed running.

The above description is merely an embodiment and the present invention may be implemented in variously modified and improved forms based on the knowledge of those skilled in the art.

NOMENCLATURE OF ELEMENTS 10, 200, 250, 260: hybrid vehicle (vehicle)
14: engine
16: front drive wheels (wheels)
18: rear drive wheels (wheels)
20: automatic transmission
35: transmission output shaft (output rotation member)
50: shift lever (running position selection device)
60: downshift switch (deceleration increasing device)
100: electronic control device (control device)
C1: first clutch (connection/disconnection device)
C2: second clutch (connection/disconnection device)
MG1: first motor generator (electric generator)
MG2: second motor generator (rotating machine)

The invention claimed is:

1. A control device of a vehicle comprising: an engine; a connection/disconnection device configured to connect/interrupt the engine with respect to wheels; a rotating machine disposed to enable transmission of drive power to the wheels; and a running position selection device configured to select an automatic running position and a manual running position, the control device of a vehicle including a first manual mode selected by performing a deceleration increasing operation by a driver for increasing vehicle deceleration while the automatic running position is selected and a second manual mode selected by performing a deceleration increasing operation by a driver for increasing the vehicle deceleration while the manual running position is selected,
   while the vehicle is running with the engine interrupted from the wheels,
   if the first manual mode is selected, the vehicle deceleration being generated only by the rotating machine, and
   if the second manual mode is selected, the connection/disconnection device being put into the connected state to generate the vehicle deceleration at least by the engine.

2. The control device of a vehicle of claim 1, wherein if the engine is stopped when the first manual mode is selected, the engine is started with the connection/disconnection device in an interrupted state.

3. The control device of a vehicle of claim 2, further comprising an electric generator coupled to the engine, wherein
   starting the engine with the connection/disconnection device in an interrupted state corresponds to making a shift to series running in which the vehicle deceleration is generated only by the rotating machine while the electric generator is rotationally driven by power of the engine to generate electricity.

4. The control device of a vehicle of claim 2, wherein if the engine is stopped when the first manual mode is selected, a rotation speed of the engine after start is made lower as compared to the case that the engine is already activated.

5. The control device of a vehicle of claim 1, wherein if the manual running position is selected in the running position selection device while the first manual mode is continued, the connection/disconnection device is put into the connected state to generate the vehicle deceleration by the engine.

6. The control device of a vehicle of claim 1, further comprising an automatic transmission configured to shift gears depending on a shift operation by a driver, wherein the connection/disconnection device includes a first clutch disposed between the engine and an output rotation member of the automatic transmission and a second clutch disposed between the output rotation member of the automatic transmission and the wheels, wherein the interrupted state of the connection/disconnection device is a state in which at least one of the first clutch and the second clutch is released such that power cannot be transmitted, and wherein the connected state of the connection/disconnection device is a state in which both the first clutch and the second clutch are engaged such that power can be transmitted.

7. The control device of a vehicle of claim 6, wherein
if the first manual mode is selected, the first clutch is engaged while the second clutch is released, and wherein
if the manual running position is selected in the running position selection device while the first manual mode is continued, the second clutch is engaged.

8. The control device of a vehicle of claim 6, wherein
if the automatic running position is switched to the manual running position in the running position selection device, the first clutch is engaged while the second clutch is released, and wherein
if the deceleration increasing operation is performed, the second clutch is engaged.

9. The control device of a vehicle of claim 1, further comprising a deceleration increasing device configured to increase the vehicle deceleration based on an operation of the driver separately from the running position selection device, wherein
the deceleration increasing operation is an operation of the driver using the deceleration increasing device.

10. A control device of a vehicle comprising: an engine; a connection/disconnection device configured to connect/interrupt the engine with respect to wheels; a rotating machine disposed to enable transmission of drive power to the wheels without through the connection/disconnection device; a running position selection device configured to select an automatic running position and a manual running position based on an operation of a driver; and a deceleration increasing device disposed separately from the running position selection device, the deceleration increasing device being configured to increase vehicle deceleration based on an operation of the driver,
while the vehicle is running with the engine interrupted from the wheels,
if the vehicle deceleration is increased by performing a deceleration increasing operation increasing the vehicle deceleration in the deceleration increasing device when the manual running position is selected in the running position selection device,
a torque capacity of the connection/disconnection device being made larger as compared to the case that the vehicle deceleration is increased with the engine interrupted from the wheels by performing the deceleration increasing operation increasing the vehicle deceleration in the deceleration increasing device when the automatic running position is selected in the running position selection device.

11. The control device of a vehicle of claim 10, wherein
if the engine is stopped when the automatic running position is selected and the deceleration increasing operation is performed by the driver, the engine is started with the connection/disconnection device in an interrupted state.

12. The control device of a vehicle of claim 11, further comprising an electric generator coupled to the engine, wherein
starting the engine with the connection/disconnection device in an interrupted state corresponds to making a shift to series running in which the vehicle deceleration is generated only by the rotating machine while the electric generator is rotationally driven by power of the engine to generate electricity.

* * * * *